(12) United States Patent
Barker et al.

(10) Patent No.: US 7,004,778 B2
(45) Date of Patent: Feb. 28, 2006

(54) ELECTRICAL CONNECTION APPARATUS AND METHOD FOR AN AIRBAG INFLATOR

(76) Inventors: Kent Barker, 5156 E. 2275 North, Eden, UT (US) 84310; Jeff Kida, 1101 N. 3000 East, Layton, UT (US) 84040; Dario Brisighella, Box 514, Mendon, UT (US) 84325; Brent Parks, 6043 S. Lima St., Englewood, CO (US) 80111

( * ) Notice: Subject to any disclaimer, the term of this patent is extended or adjusted under 35 U.S.C. 154(b) by 0 days.

(21) Appl. No.: 10/614,577

(22) Filed: Jul. 7, 2003

(65) Prior Publication Data

US 2005/0009390 A1    Jan. 13, 2005

(51) Int. Cl.
H01R 13/627 (2006.01)
H01R 13/62 (2006.01)

(52) U.S. Cl. ..................... 439/352; 439/366
(58) Field of Classification Search ............. 439/352, 439/299, 302, 309, 355, 366
See application file for complete search history.

(56) References Cited

U.S. PATENT DOCUMENTS

| | | |
|---|---|---|
| 3,291,046 A | 12/1966 | Dahl |
| 3,971,320 A | 7/1976 | Lee |
| 4,070,557 A | 1/1978 | Ostapovitch |
| 4,261,263 A | 4/1981 | Coultas et al. |
| 4,267,567 A | 5/1981 | Nygaard et al. |
| 4,369,707 A | 1/1983 | Budde |
| 4,621,578 A | 11/1986 | Vallieres et al. |
| 5,275,575 A * | 1/1994 | Cahaly et al. ............. 439/188 |
| 5,334,025 A | 8/1994 | Föhl |
| 5,404,263 A | 4/1995 | Graves et al. |
| 5,686,691 A | 11/1997 | Hamilton et al. |
| 5,772,460 A * | 6/1998 | Baumann .................. 439/352 |
| 5,944,545 A | 8/1999 | Willhelm et al. |
| 5,993,230 A | 11/1999 | Gauker et al. |
| 6,029,995 A * | 2/2000 | Fink ........................ 280/737 |
| 6,203,342 B1 | 3/2001 | Gauker et al. |
| 6,398,590 B1 * | 6/2002 | Banas et al. ............... 439/668 |
| 6,607,406 B1 * | 8/2003 | Banas et al. ............... 439/668 |
| 2002/0145275 A1 | 10/2002 | Hosey et al. |

* cited by examiner

*Primary Examiner*—Chandrika Prasad
(74) *Attorney, Agent, or Firm*—Sally J Brown

(57) ABSTRACT

An airbag module has an inflator activated via an electrical connector. The inflator includes an initiation assembly having an initiator and a receptacle that retains the connector. The initiator may have a single, center pin. The initiator may be encased by a body and cover, which may be attached together by molding, vibratory welding, electromagnetic welding, or snap fitting. The connector may have projections that extend from a main body to facilitate retention of the connector by a collar, washer, a retainer attached to the body, or by the inflator housing. The body may be seated in a collar having an annular ridge that presses into the body to form a seal. The connector may have a rib designed to mesh with splines of the receptacle to enable engagement of the connector with the receptacle in multiple orientations, while preventing relative rotation between the connector and the initiator after assembly.

44 Claims, 19 Drawing Sheets

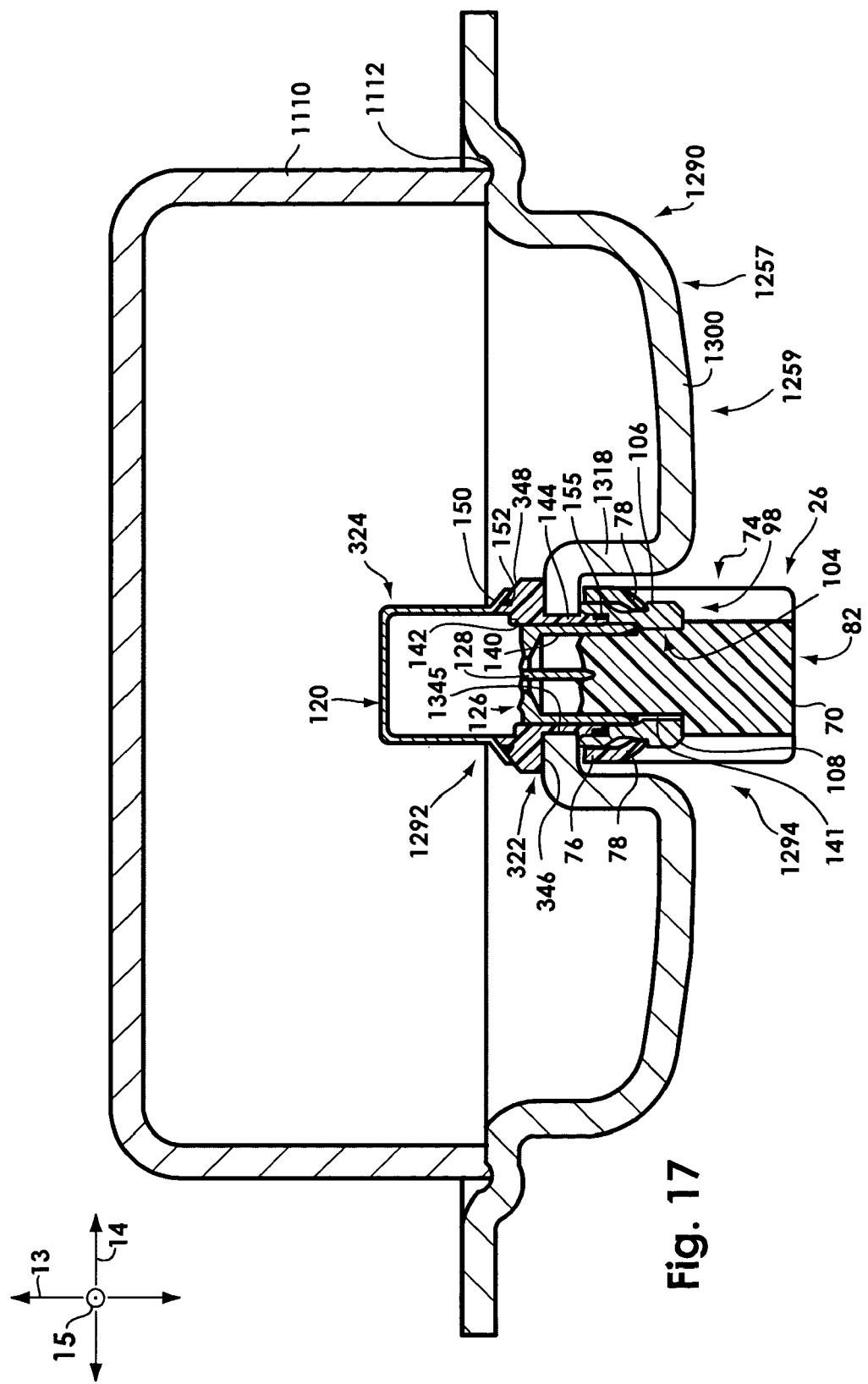

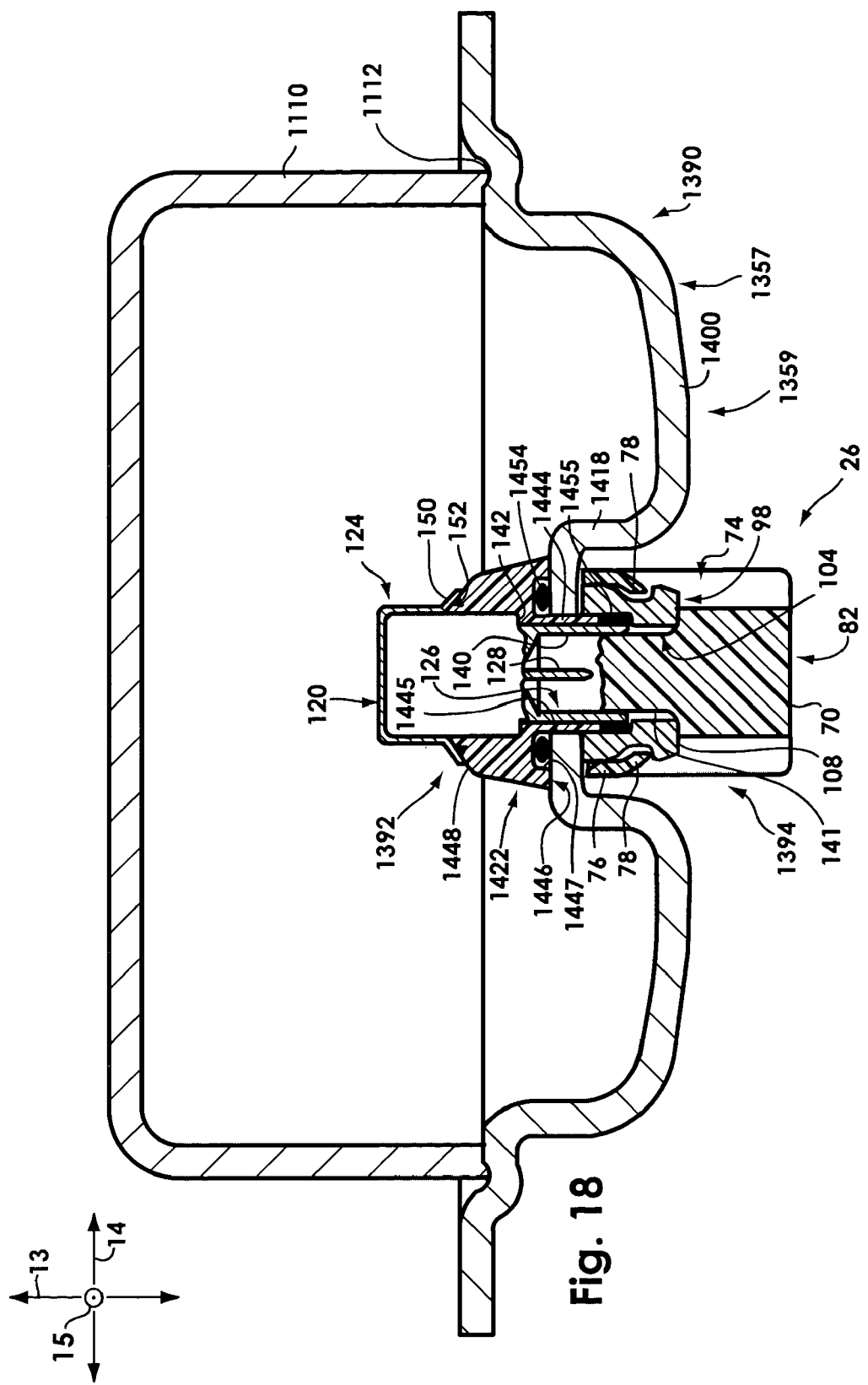

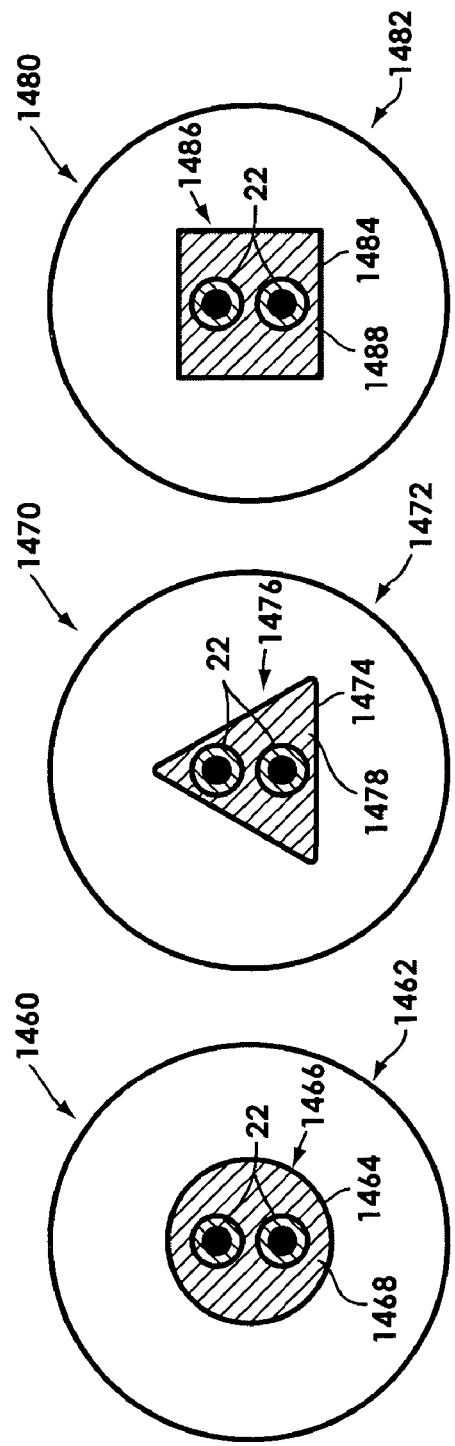

ELECTRICAL CONNECTION APPARATUS AND METHOD FOR AN AIRBAG INFLATOR

BACKGROUND OF THE INVENTION

1. Field of the Invention

The present invention relates to systems and methods for protecting vehicle occupants from injury. More specifically, the present invention relates to inflators and associated electrical connectors for airbag systems.

2. Description of Related Art

The inclusion of inflatable safety restraint devices, or airbags, is now a legal requirement for many new vehicles. Airbags are typically installed in the steering wheel and in the dashboard on the passenger side of a car. In the event of an accident, an accelerometer within the vehicle measures the abnormal deceleration and triggers the expulsion of rapidly expanding gases from an inflator. The expanding gases fill the airbags, which immediately inflate in front of the driver and passenger to protect them from impact against the windshield.

Side impact airbags such as inflatable curtains and seat mounted airbags have also been developed in response to the need for protection from impacts in a lateral direction, or against the side of the vehicle. Other airbags such as knee bolsters and overhead airbags also operate to protect various parts of the body from collision.

A variety of inflator types are typically used to inflate such airbags. Known inflators generally fall into three categories: pyrotechnic inflators, compressed gas inflators, and hybrid inflators. Pyrotechnic inflators depend solely on combustion to provide inflation gas, while compressed gas inflators may use only a minimal amount of pyrotechnic that opens a chamber to release the inflation gas from a compressed state. Hybrid inflators use a combination of combustion and compressed gas storage to provide the inflation gas to fill the cushion.

Many known inflators contain an initiator, also known as a "squib," that ignites in response to receipt of an electrical activation signal. The squib may be sealed and/or mounted in the inflator through the use of techniques such as insert molding. Unfortunately, such techniques can be quite time consuming and labor intensive. Insert molding often requires manual positioning of a part within a mold. Thus, fully automated production is not feasible.

Many inflators require the presence of a hermetic seal to keep moisture from entering the interior of the inflator to interfere with pyrotechnic materials or to prevent compressed gases from leaking out of the inflator. O-rings and other sealing mechanisms may be disposed around the initiator to provide sealing. However, such sealing devices add expense to the inflator. Furthermore, such additional sealing parts may accidentally be omitted during assembly.

As mentioned above, an activation signal is used to trigger ignition of the initiator. The activation signal is provided by an electronic control unit, or ECU, that reacts to a collision involving the vehicle by transmitting the activation signal. The ECU is connected to the inflator by an electric line that terminates in a connector electrically coupled to the initiator.

Unfortunately, many known connectors must be oriented prior to assembly. Dual-pin connectors, for example, must be aligned in a specific orientation, or at best, one of two opposite orientations. Single-pin connectors provide the ability to install the connector at any orientation. However, such connectors typically include no feature to prevent rotation of the connector after assembly. Hence, the connector may rotate within the inflator under the vibrations induced by vehicle operation. This rotation may produce undesirable noise or abrade away the conductive surfaces within the connector or the inflator, thereby endangering the integrity of the electrical connection.

Furthermore, many known inflators have comparatively expensive interlock mechanisms designed to receive the associated connector. For example, many inflators have an insert with an undercut, interior groove that interlocks with the connector. Such interior features must often be produced through methods such as machining, and are therefore time and labor intensive to produce. Such costs add significantly to the overall cost of the inflator.

SUMMARY OF THE INVENTION

The apparatus and method of the present invention have been developed in response to the present state of the art, and in particular, in response to the problems and needs in the art that have not yet been fully solved by currently available airbag inflators and related hardware and methods. Thus, it is an overall purpose of the present invention to provide an airbag inflation apparatus and method that provides for economical production, easy electrical connection, and reliable operation after assembly.

According to one embodiment, an inflator according to the invention is incorporated into an airbag module. The airbag module may optionally be an inflatable curtain module, or IC module, with an inflatable cushion configured to activate to shield a vehicle occupant from impact against a lateral surface of the vehicle, such as a door or window. The cushion preferably has at least one protection zone, and may optionally have multiple protection zones, each of which may serve to protect one occupant. Thus, a single cushion may, for example, cover a rear door or surface as well as a front door, so that an occupant of a back seat can be protected as well as an occupant of a front seat. The protection zones may be connected by a central tether configured to convey tension and inflation gas between the protection zones.

The IC module also has an inflator disposed partially within the cushion such that inflation gas is able to flow from the inflator directly into the cushion. The inflator is coupled to an electronic control unit (ECU) via a connector attached to the end of electric lines extending from the ECU. The inflator and the connector, combined, form an inflation assembly. The ECU is coupled to an accelerometer that reads the acceleration of the vehicle and transmits an activation signal to trigger deployment of the inflator when a collision is detected.

The connector has a head with grips to facilitate grasping by hand. The grips encircle a head, from which a skirt extends. The skirt has a distal ring from which a deflectable tab that protrudes inward. A plurality of ribs also extend inward from the distal ring. The head, grips, and skirt form a main body. An extension extends from the main body to connect to the electric lines.

The inflator has a housing with an initiation assembly including an initiator and a receptacle. The receptacle has a collar and a retainer disposed within the collar. The collar is seated in the housing. The retainer has a generally annular shape and is formed of a resilient material. The retainer has an outside diameter on which a plurality of splines are arrayed.

The inflator housing has an initiation end and a containment end, which may be separate pieces attached together by welding or the like. The containment end contains a quantity of generant designed to ignite to produce inflation gas. The generant may be sealed from the initiator by a burst disc. An initiation passageway may provide communication between the initiator and the burst disc so that, upon ignition of the initiator, hot gases from the initiator are able to open the burst disc. The initiator is generally encased by a body and a cover to seal and/or protect the initiator.

The initiator may be of any known variety. According to one example, the initiator has a header eyelet with a generally annular shape. A center pin is centered within the header eyelet and electrically insulated from the header eyelet by an annular seal disposed between the center pin and the header eyelet. The header eyelet is welded or otherwise attached to a charge holder designed to retain a quantity of ignition material. A can may be used to cover and/or seal the ignition material, the charge holder, and a portion of the header eyelet.

A bridge wire lies along the annular seal to electrically couple the header eyelet with the center pin. Upon placement of an electric voltage between the center pin and the header eyelet, current moves through the bridge wire to cause rapid resistance heating and combustion of the bridge wire. Combustion of the bridge wire triggers combustion of the ignition material.

The header eyelet has a skirt designed to receive and encircle a portion of an extending shank of the connector. The header eyelet also has a shoulder that abuts the body. The body has a skirt that encircles the skirt of the header eyelet. The body and the header eyelet may be relatively sized to be press fit together so that gases are not able to pass between the body and the header eyelet. The body has an outward shoulder that abuts the collar. The skirt of the body passes within the collar, and may be sized to provide a press fit with respect to the collar. Alternatively, another portion of the body may be sized to be press fit into the initiation end of the housing.

The body also has an inward shoulder to which the cover is attached. The cover has a rim which may be flared to mate with the inward shoulder. The rim and the inward shoulder may be attached together via ultrasonic welding. The retainer is ultrasonically welded to the skirt of the body. Hence, the retainer is secured to the initiator.

The connector may be easily coupled to the inflator. The distal ring of the skirt of the connector is inserted into the annular space between the retainer and the collar. The deflectable tabs deflect to slide past the splines of the retainer. Meanwhile, distal ring may have to be rotated slightly to cause the ribs of the distal ring mesh with the splines of the retainer. This rotation is facilitated by chamfers on the splines of the retainer and the splines of the connector.

Once the ribs and splines mesh, the skirt may be further inserted until the deflectable tabs move back to their inwardly-extending, relatively undeflected positions. In doing so, the deflectable tabs abut the inward faces of the splines to block withdrawal of the skirt from the receptacle. Thus, the connector is nonremovably retained by the retainer. The splines and ribs continue to mesh to prevent relative rotation between the connector and the inflator.

The initiation assembly may be manufactured in a variety of ways. According to one example, the retainer, the body, the cover, and the skirt of the connector may all be formed of polymeric materials. The collar and inflator housing may be formed of metals such as steel or aluminum. The initiator may be manufactured according to known pyrotechnic initiator manufacturing methods.

The collar is pressed onto the skirt of the body. The retainer is then ultrasonically welded to the skirt of the body. The initiator subassembly is then inserted such that the skirt of the header eyelet passes within the skirt of the body. The cover is ultrasonically welded to the inward shoulder of the body to generally encase the initiator. The initiation assembly, e.g., the body, cover, retainer, initiator, and collar, are then attached together. The initiation assembly is inserted into the initiation end of the inflator housing such that the initiator and the cover extend into the initiation passageway. The initiation end is crimped to retain the collar, and hence, the entire initiation assembly.

According to alternative methods, the initiator subassembly may be inserted into the body, and the cover may be attached to the body prior to insertion of the skirt of the body into the collar. The remaining steps in the assembly process are then similar to those described above.

According to one alternative embodiment, an inflation assembly has a connector identical to that described above, and an inflator with a somewhat different initiation assembly. The initiation assembly has a receptacle designed to receive the connector. The receptacle has a collar and an integral member that acts as a retainer/body. The initiation assembly also has an initiator and a cover that cooperates with the body to generally encase the initiator.

The body has a bridge that extends within the collar. The body has an outward shoulder that abuts the collar and a retention shoulder that cooperates with the outward shoulder to retain the collar. More specifically, the collar includes a first piece and a second piece. The first piece is shaped to form a washer around which the body/retainer can be relatively easily insert molded. The second piece can then be welded to the first piece.

The body also has an inward shoulder that may abut the initiation end of the inflator housing. The cover has a rim that lies along the initiator subassembly. The body is insert molded around the initiator, the cover, and the first piece so that the cover is held in place over the initiator by the body. A single insert molding operation may thus be used to obviate two ultrasonic welding operations from the previous embodiment.

Attachment of the connector to the receptacle is made in substantially the same manner as in the previous embodiment. The initiation assembly may be made by providing the initiator, forming the cover of a polymeric material, and forming the first and second pieces of the collar of metals. The body/retainer is then insert molded around the first piece of the collar, the cover, and the initiator. The second piece of the collar is welded to the first piece. The initiation assembly is then inserted into the initiation end of the housing such that the initiator extends into the initiation passageway. The housing is then crimped to retain the collar, and thence the entire initiation assembly.

According to another alternative embodiment of the invention, an inflation assembly includes a connector designed to be serviceably, e.g., removably, attached to an inflator. As with the previous embodiments, the connector may have a first piece attached to a second piece through the use of interlocking brackets and tabs. The connector also has a locking bracket that is movable with respect to a main portion of the connector to lock or unlock the connector in engagement with the inflator. The main portion includes a head with a slot.

The locking bracket has a head plate with a pair of locking arms and a shorting rib, each of which extends generally perpendicular to the head plate. The shunting rib is aligned with the slot of the head. Flexible arms extend from the head, inward of the locking arms of the locking bracket. Each flexible arm has a slot in which the associated locking arm rides, and an enlarged end that protrudes inward. A skirt also extends from the head. The skirt has openings to accommodate the flexible arms and a distal ring on which a plurality of ribs are disposed. A shank extends from the head and lies generally inside the skirt.

The inflator has a housing within which an initiation assembly is disposed. The initiation assembly includes a receptacle with a configuration somewhat similar to that of the first embodiment. The receptacle includes a collar seated in the housing and a retainer disposed within the collar. The retainer has splines arrayed about its outside diameter. The splines are designed to mesh with the ribs of the connector to permit installation of the connector at a plurality of angles, while preventing relative rotation after assembly.

The main body of the connector contains a central contact designed to receive and make electrical contact with the center pin. The main body also has a peripheral contact designed to pass within and make electrical contact with the header eyelet. The main body further contains a first conductor electrically coupled to the center pin, a second conductor electrically coupled to the peripheral contact, and a shunting bar extending between the first and second conductors. The shunting bar is attached to the first conductor and is biased into contact with the second conductor.

Like the first embodiment, the initiation assembly includes an initiator, which may be generally encased by a body and a cover ultrasonically welded to the body. A shunting clip may be disposed within the header eyelet. The shunting clip has a plurality of resilient arms that make electrical contact between the header eyelet and the center pin when the shank of the connector is not disposed inside the skirt of the header eyelet.

When the connector is inserted into the receptacle, the connector may have to rotate slightly to an orientation in which the ribs mesh with the splines. This rotation is facilitated by chamfers on the splines. The connector is inserted such that the shank passes within the skirt of the header eyelet and the flexible arms flex to permit the enlarged ends of the flexible arms to pass around the splines of the receptacle. The shank spreads the resilient arms of the shunting clip to break the electrical contact between the header eyelet and the center pin.

When the enlarged ends are in place, the locking bracket is pressed toward the head such that the locking arms extend on either side of the flexible arms to keep the flexible arms from flexing outward. The connector is thus locked in engagement with the receptacle and may be removed for servicing by withdrawing the locking bracket and then withdrawing the connector from the receptacle. Moving the locking bracket to the locked position also causes the shunting rib to pass through the slot of the head to contact the shunting bar. The shunting bar is deflected to break the electrical contact between the central and peripheral contacts. An electrical potential may then be sustained across the header eyelet and the center pin to induce ignition of the initiator.

The initiation assembly may be manufactured in a manner similar to the methods described in connection with the first embodiment. If desired, an identical initiation assembly may interchangeably receive either a nonserviceable connector, like that of the first embodiment, or a serviceable connector, like that just previously described. The same inflator may thus be used in serviceable and nonserviceable installations.

According to another alternative embodiment, an inflation assembly may have a connector with a locking ridge that takes the place of the skirt of the connectors of the previous embodiments. The locking ridge is disposed at the base of the shank and has a plurality of ribs oriented outward, rather than inward. The inflation assembly has an inflator with a receptacle having a retainer with inward-oriented splines that mesh with the ribs. The connector may be a serviceable connector with flexible arms and a locking bracket configured in a manner similar to that of the previous embodiment.

The remainder of the inflator, besides the retainer, may also be similar to that of the previous embodiment. Thus, the method of connecting the connector may also be similar to that described previously. Outward-oriented ribs and inward-oriented splines may also be used in an inflation assembly having a nonserviceable connector.

According to another embodiment of the invention, an inflation assembly has a connector and an inflator with a receptacle that operates without a retainer. More precisely, the connector has a housing that may be constructed substantially of a single piece. A locking extension extends from the housing, and a shank further extends from the locking extension. Deflectable tabs and ribs extend outward from the locking extension. As in previous embodiments, conductors are disposed on the shank to make electrical contact with the center pin and the header eyelet. The connector comprises a main body including the locking extension and the shank, and an extension that connects to the electric lines.

The inflator has a housing in which an initiation assembly is disposed. The initiation assembly includes an initiator and a receptacle for receiving the connector. The receptacle includes a collar with a plurality of splines arrayed about an inside diameter of the collar. The splines are designed to mesh with the ribs of the locking extension.

The receptacle includes a body and a cover, which may be ultrasonically welded together to generally encase the initiator in a manner similar to that described in connection with previous embodiments. The body has an outward shoulder that abuts the inside diameter of the collar. A crimped lip is formed in the collar to retain an inward shoulder of the collar to keep the body, cover, and initiator in place. The body also has a press fit portion, which is sized to be interference fitted into place within the collar to form a seal. The collar is seated in an initiation end of the inflator housing.

The connector is installed by inserting the shank and the locking extension into the collar. The deflectable tabs deflect to slide past the splines in the inside diameter of the collar. The ribs and splines can then mesh together, which may require slight rotation of the connector, so that the deflectable tabs will move fully past the splines to return to a less deflected state. The deflectable tabs then abut the interior of the collar to prevent withdrawal of the locking extension from the collar.

Manufacture of the initiation assembly may be as described in connection with previous embodiments, except that no retainer need be installed. The splines may be cast or otherwise formed on the inside diameter of the collar to obviate the retainer.

According to another embodiment of the invention, an inflation assembly may utilize the connector of the previous embodiment with an initiation assembly having a different configuration. The initiation assembly has a receptacle that utilizes a washer in place of the collar to facilitate retention of the initiation assembly in an inflator housing. The washer has an inside diameter along which splines are arrayed.

The initiation assembly also has an initiator, a body, and a cover attached to the body to generally encase the initiator. The body has an outward shoulder that abuts the washer. The cover is snap fitted, or snapped into engagement, with the body. More specifically, the cover has a rim with a lip, and the body also has a lip. The rim of the cover is able to enlarge with respect to the body to permit the lips to slide past each other. Then, when the rim returns to its original size, the lips of the body and the cover are interlocked.

The initiation assembly also includes an o-ring that encircles the cover, proximate the rim. The initiation end of the housing is shaped such that the o-ring is compressed between the cover and the initiation end to form a seal. The initiation end has a crimped lip outside the washer to hold the washer, and thence, the remainder of the initiation assembly, in place.

The initiation assembly may be installed by, first, snapping the body and the cover around the initiator. The o-ring may then be positioned in the initiation end, and the body, cover, and initiator may be inserted. Then, the washer may be disposed to rest against the outward shoulder of the body, and the initiation end may be crimped to hold the washer in place.

According to another alternative embodiment, an inflation assembly includes the connector of the previous two embodiments and an inflator with a modified initiation assembly and receptacle. The receptacle has a collar and a washer designed to fit inside the collar. The collar has an interior diameter on which splines are arrayed.

The initiation assembly includes an initiator, a body, and a cover designed to be ultrasonically welded to the body to generally encase the initiator in a manner similar to that described previously. The body has an outward shoulder that abuts the washer and an inward shoulder to which a rim of the cover is attached. The body also has a press fit portion sized to be press fitted within the collar. The washer is effectively sandwiched between the body and the collar to ensure that the body remains properly positioned within the collar. A crimped lip is formed in the collar to retain the cover. The crimped lip cooperates with the washer and the interior geometry of the collar to retain the entire initiation assembly.

The initiation assembly may be assembled by, first, attaching the body and the cover to each other to generally encase the initiator. The washer may be positioned around the body. The washer, body, cover, and initiator may then be installed in the collar and the collar may be crimped to hold the washer, body, cover, and initiator in place. The collar may then be seated in the initiation end of the inflator housing.

According to another embodiment of the invention, an inflation assembly may utilize the same connector, in conjunction with an inflator having a modified initiation assembly. The initiation assembly has a receptacle that includes a collar and a washer. The washer is disposed within the collar. The initiation assembly also includes an initiator and a body and cover that are ultrasonically welded together to generally encase the initiator.

The body is insert molded around the washer and the initiator. The washer protrudes from the body to abut the interior of the collar to ensure that the body remains properly positioned within the collar. The initiation assembly may be assembled by first, insert molding the body around the washer. The initiator is then inserted into the body and washer, and the cover is inserted to cover the remainder of the initiator, and ultrasonically welded to the body. The initiator, body, cover, and washer are then inserted into the collar and a crimped lip is formed in the collar to abut the rim of the cover, thereby retaining the initiator, body, cover, and washer within the collar. The collar is then seated in the initiation end of the inflator housing.

According to another alternative embodiment of the invention, an inflation assembly has a connector identical to those of the previous embodiments and an inflator with a modified initiation assembly. The initiation assembly has a receptacle with a stamped collar. The stamped collar has an inside diameter on which a plurality of splines are formed.

The initiation assembly also has an initiator and a body and cover ultrasonically welded together to generally encase the initiator. The body is insert molded around the collar in such a manner that the body has a skirt disposed inward of the collar and a remainder that generally encircles the collar. Thus, the collar is effectively sandwiched between the skirt and the remainder of the body. The body has a press fit portion sized to be press fitted into the initiation end of the inflator housing.

The initiation assembly is assembled by insert molding the body around the collar, and then inserting the initiator into the body. The cover is disposed on the initiator and ultrasonically welded to the body. The collar, body, initiator, and cover are then inserted into the initiation end of the inflator housing. The initiation end is crimped to retain the collar, and thence, the body, initiator, and cover.

According to another embodiment of the invention, an inflation assembly includes the same connector used in conjunction with an inflator having a modified initiation assembly. More precisely, the initiation assembly has a collar having an interior diameter on which splines are arrayed. The initiation assembly also has an initiator generally encased by a body and a cover. The cover snaps into engagement with the cover in the manner described in connection with a previous embodiment.

The body has an outward shoulder that abuts the interior of the collar. The collar has a generally conical interior surface that receives the outward shoulder. An annular ridge extends from the generally conical interior surface to press into the outward shoulder. Deformation of the outward shoulder by the annular ridge forms a seal tending to keep moisture out of the initiator and the remainder of the inflator. The collar is crimped to retain the body, cover, and initiator.

The initiation assembly may be assembled by inserting the body into the collar, then inserting the initiator into the body. The cover may then be disposed on the initiator and snapped into engagement with the body. The collar may then be crimped to retain the body, cover, and initiator, thereby pressing the annular ridge into the body. The collar is then seated in the initiation end of the inflator housing.

According to another embodiment of the invention, an inflation assembly includes the same connector, used in conjunction with an inflator for an airbag such as a driver's side front impact airbag. The inflator has a housing with an initiation end in which a socket is formed to receive an initiation assembly. The initiation assembly includes a washer, an initiator, a body, and a cover. The washer has an inside diameter on which splines are formed to mesh with the ribs of the connector.

The body and the cover are snapped together to generally encase the initiator in a manner that has been described previously. The body has an outward shoulder that abuts the washer. The washer is welded to the initiation end of the inflator housing. An o-ring is disposed by a rim of the cover to seal the initiator and the remainder of the inflator.

The initiation assembly may be assembled by, first snapping the body and cover together around the initiator. The o-ring may be positioned, either within the socket or around the cover. The cover, body, and initiator are then inserted into the socket. The washer is disposed to cover the socket and welded to the housing to retain the body, cover, initiator, and o-ring.

According to another embodiment of the invention, an inflation assembly includes the same connector, used in conjunction with a driver's side inflator having a different housing and initiation assembly. More specifically, the housing has an initiation end and the initiation assembly has a collar welded to the initiation end. The initiation end of the housing has an inside diameter on which splines are arrayed to mesh with the ribs of the connector.

The initiation assembly has an initiator and a cover and a body that are ultrasonically welded together around the initiator to generally encase the initiator. The body has an outward shoulder that abuts the initiation end of the housing. The outward shoulder has an annular recess that receives an o-ring.

The initiation assembly may be assembled by, first, ultrasonically welding the body and the cover together around the initiator. The o-ring is inserted into the annular recess of the outer shoulder, and the initiator, the cover, and the body are inserted into the collar. The collar is then welded to the ignition end of the housing.

According to another embodiment of the invention, an inflation assembly includes the connector of the first embodiment, used in conjunction with a driver's side inflator having a different housing and initiation assembly. More specifically, the housing has an initiation end with a socket formed therein. The receptacle includes a retainer, on which splines are arrayed to mesh with the ribs of the connector.

The initiation assembly has an initiator and a cover and a body that are ultrasonically welded together around the initiator to generally encase the initiator. The body has an outward shoulder that abuts the socket and a skirt that extends through the socket. The retainer is ultrasonically welded to the skirt.

The initiation assembly may be assembled by, first, ultrasonically welding the body and the cover together around the initiator. The initiator, the cover, and the body are inserted into engagement with the socket. The retainer is then ultrasonically welded to the skirt so that the retainer, the initiator, the cover, and the body remain coupled to the socket.

According to another embodiment of the invention, an inflation assembly includes the connector of the first embodiment, used in conjunction with a driver's side inflator having a different housing and initiation assembly. More specifically, the housing has an initiation end with a socket formed therein. The receptacle includes a retainer, on which splines are arrayed to mesh with the ribs of the connector.

The initiation assembly has an initiator and a cover and a body that are ultrasonically welded together around the initiator to generally encase the initiator. The body has an outward shoulder in which an annular recess is formed. An o-ring is disposed within the annular recess. The outward shoulder and the o-ring abut the socket to prevent gas flow into or out of the inflator through the socket. The body also has a skirt that extends through the socket. The retainer is ultrasonically welded to the skirt.

The initiation assembly may be assembled by, first, ultrasonically welding the body and the cover together around the initiator. The o-ring is inserted into the annular recess. The initiator, the cover, the body, and the o-ring are inserted into engagement with the socket. The retainer is then ultrasonically welded to the skirt so that the retainer, the initiator, the cover, and the body remain coupled to the socket.

If desired, receptacles for different inflators may have different numbers of splines to ensure that each inflator can only be connected to the proper connector. In the case of an adaptive inflator including multiple initiators, two receptacles may be provided in the inflator to couple connectors to two different initiators. The two receptacles may have different numbers of splines to ensure that each connector is coupled to the proper receptacle.

According to other alternative embodiments, connectors and receptacles having other features besides splines and/or ribs may be used to "key code" an inflation assembly to prevent improper assembly. For example, a connector may have a circular, triangular, square, pentagonal, or hexagonal shape. An inflator receptacle may have a corresponding shape that receives the shape of the connector. Such shapes may also enable insertion of the connector into the receptacle in multiple orientations without permitting post-assembly rotation.

The initiation assemblies provided by the present invention are not limited in application to airbags. Rather, the systems and methods of the invention may be used in conjunction with a variety of pyrotechnic devices such as explosives, flares, visual effects, and the like.

Through the system and method of the present invention, an inflator may be relatively inexpensively manufactured and assembled without the use of time and labor intensive operations such as machining. The inflator may be easily connected to an electrical connector in any of several relative orientations. However, after connection, the connector is unable to rotate with respect to the inflator, thereby enhancing the reliability of the inflator's operation. The inflator may be reliably sealed without the installation of extra sealing parts. These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 17 is a side elevation, section view of an inflation assembly according to another alternative embodiment of the invention, with the connector connected to the inflator;

FIG. 18 is a side elevation, section view of an inflation assembly according to yet another alternative embodiment of the invention, with the connector connected to the inflator; and FIGS. 19a through 19e are front elevation, section views of inflation assemblies according to still other alternative embodiments of the invention, with the connectors connected to the inflators.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 19e, is not intended to limit the scope of the invention, as claimed, but is merely representative of presently preferred embodiments of the invention.

The present invention utilizes a number of different principles to enhance the cost-effectiveness, electrical connectability, and reliability of inflators. Through the use of the present invention, labor intensive processes such as insert molding and machining may be reduced or eliminated from the inflator manufacturing process. The electrical connector may be easily connected to the inflator in a wide variety of orientations without subjecting the inflator and connector to the risks associated with free rotation of the connector within the inflator. The manner in which these results are obtained by the present invention will be described in greater detail, as follows.

For this application, the phrases "connected to," "coupled to," and "in communication with" refer to any form of interaction between two or more entities, including mechanical, electrical, magnetic, electromagnetic, and thermal interaction. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "attached directly to" refers to a form of attachment by which the attached items are either in direct contact, or are only separated by a single fastener, adhesive, or other attachment mechanism. The term "abutting" refers to items that are in direct physical contact with each other, although the items may not be attached together. The terms "integrally formed" refer to a body that is manufactured unitarily, i.e., as a single piece, without requiring the assembly of multiple pieces. Multiple parts may be integrally formed with each other if they are formed from a single workpiece.

Figure 1:
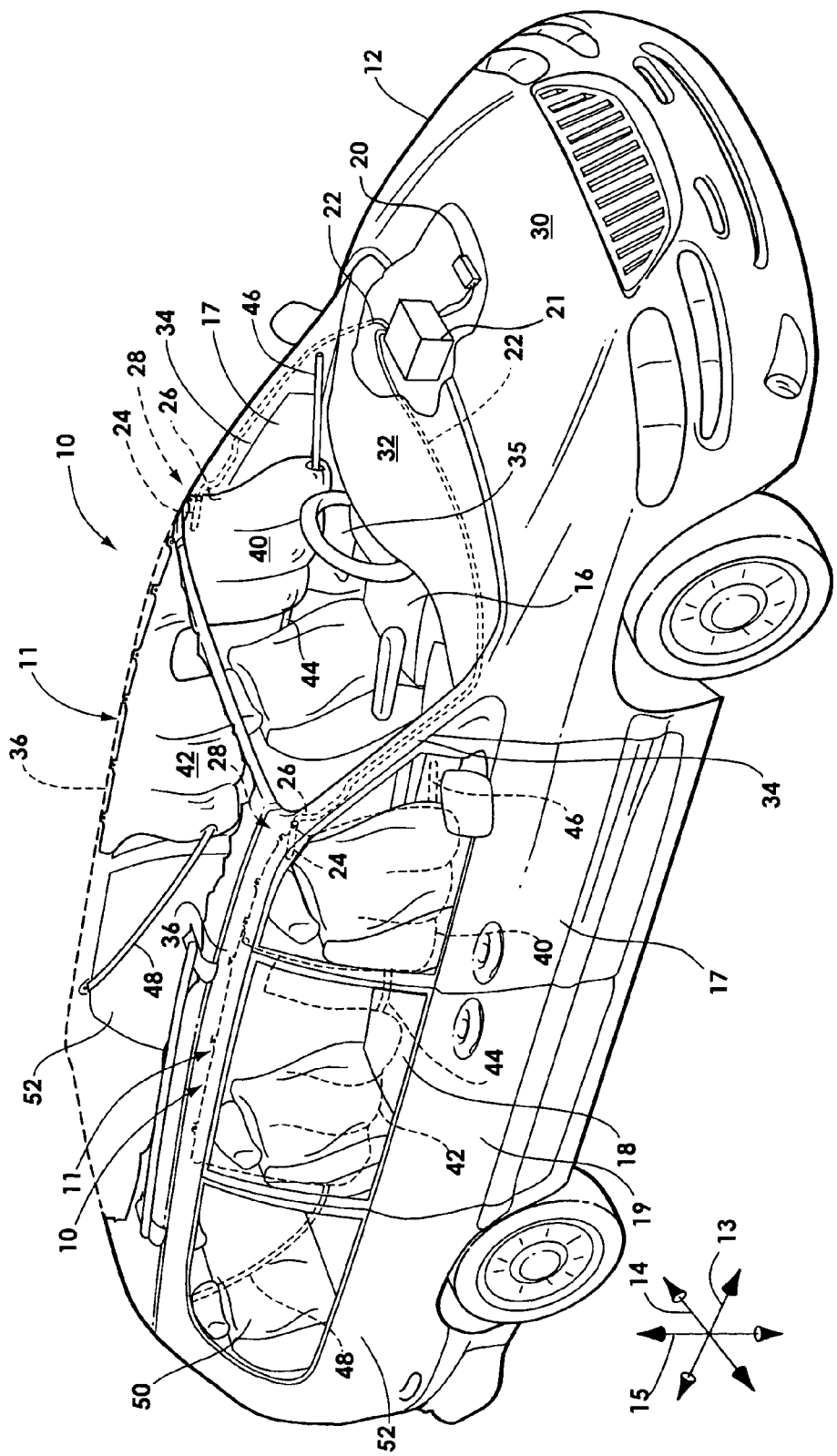
FIG. 1 is a cutaway, perspective view of a vehicle incorporating one embodiment of an airbag module according to the invention, in the form of an inflatable curtain module with the airbag cushions deployed to provide occupant protection.

Referring to FIG. 1, a perspective view illustrates two inflatable curtain modules 10, or IC modules 10, according to one possible embodiment the invention. Each of the IC modules includes a cushion 11 designed to inflate to protect an occupant of a vehicle 12. The systems and methods of the present invention may be used with other types of airbags, or with other types of pyrotechnic devices.

The vehicle 12 has a longitudinal direction 13, a lateral direction 14, and a transverse direction 15. The vehicle 12 further has front seats 16 laterally displaced from first lateral surfaces 17, or front doors 17, as shown in the vehicle 12 of FIG. 1. The vehicle 12 also has rear seats 18 laterally displaced from second lateral surfaces 19, or rear doors 19, as depicted.

An accelerometer 20 detects sudden lateral acceleration (or deceleration) of the vehicle 12. The accelerometer 20 is coupled to an electronic control unit, or ECU 21. The ECU 21 processes output from the accelerometer 20 and transmits electric signals via electric lines 22 to inflators 24 disposed to inflate each of the cushions 11. In alternative embodiments, a single inflator 24 may be coupled to both of the cushions 11 via gas guides or other structures in such a manner that the inflator 24 inflates both of the cushions 11.

Each of the inflators 24 is designed to produce inflation gas upon application of electricity to inflate the corresponding cushion 11. The inflators 24 may operate with such rapidity that, before the vehicle 12 has fully reacted to the impact, the cushions 11 have inflated to protect vehicle occupants from impact. As illustrated, each inflator 24 is coupled to the electric lines 22 via an electrical connector, or a connector 26. The combination of each inflator 24 with its associated connector 26 is an inflation assembly 28.

The accelerometer 20 and the ECU 21 may optionally be disposed within an engine compartment 30 or dashboard 32 of the vehicle 12. The electric lines 22 may be disposed along A pillars 34 of the vehicle 12 to convey electricity from the vicinity of the dashboard 32 upward, along the windshield 35, to the inflators 24. The ECU 21 may include capacitors or other devices designed to provide a sudden, reliable burst of electrical energy.

Each of the cushions 11 is installed along one of the roof rails 36. Each cushion 11 may have a first protection zone 40 configured to inflate between the front seats 16 and one of the front doors 17, and a second protection zone 42 configured to inflate between the rear seats 18 and one of the rear doors 19. The first and second protection zones 40, 42 of each cushion 11 may be attached together through the use of a central tether 44 between the protection zones 40, 42.

The first protection zone 40 of each cushion 11 may be attached to the adjoining A pillar 34 via a front tether 46. Similarly, the second protection zone 42 of each cushion 11 may be attached to the rearward portion of the adjoining roof rail 36 via a rear tether 48. The front and rear tethers 46, 48 cooperate with the central tether 44 to provide a tension line across each cushion 11 to keep the cushions 11 in place during inflation and impact. If desired, each of the cushions 11 may be extended to have one or more protection zones positioned to protect occupants of extra seats 50 behind the rear seats 18 from impact against third lateral surfaces 52 of the vehicle 12.

The inflation assemblies 28 are designed in a comparatively cost effective manner, and provide simple connection between the inflators 24 and the connectors 26 in a plurality of respective orientations without permitting post-connection rotation. The manner in which these benefits are obtained by the inflation assemblies 28 will be shown and described with reference to FIGS. 2 and 3, as follows.

Figure 2:
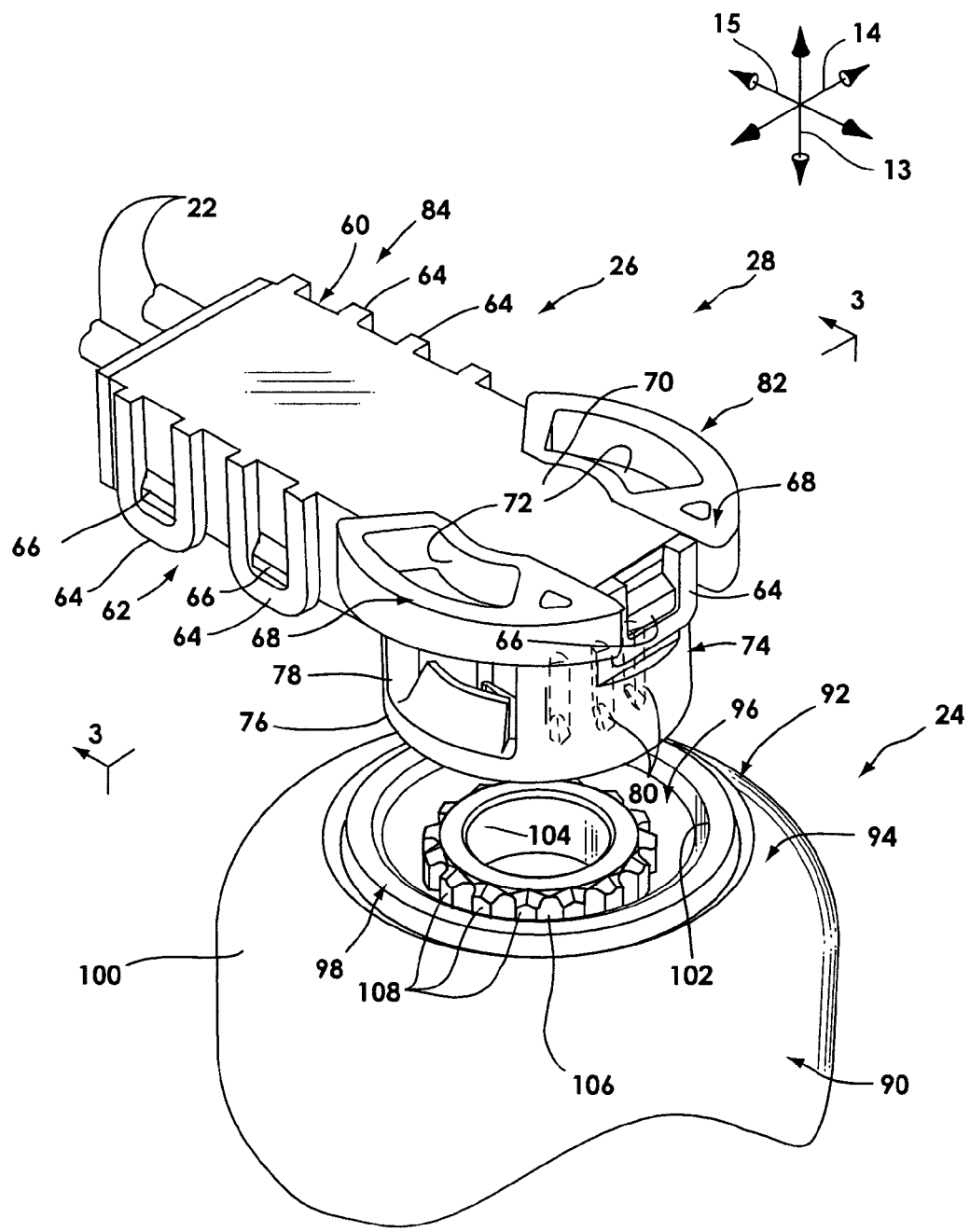
FIG. 2 is a perspective view of an inflation assembly including the connector and a portion of the inflator of the airbag module of FIG. 1, with the connector disconnected from the inflator.

Referring to FIG. 2, an enlarged, perspective view illustrates the inflation assembly 28 of the airbag module or IC module 10 of FIG. 1. As mentioned previously, the inflation assembly 28 includes the connector 26 and the inflator 24. The connector 26 has a first piece 60 and a second piece 62, each of which may be formed from polymeric materials via injection molding or the like. The first piece 60 comprises integrally formed brackets, or brackets 64, which interlock with tabs 66 formed in the second piece 62 to easily and securely attach the first and second pieces 60, 62 together.

Two grips 68 are disposed on either side of a head 70 of the connector 26 to facilitate gripping of the connector 26 by automated assembly and test equipment. The grips 68 may also be formed of polymeric materials, and may each have a slot 72 to facilitate grasping. The grips 68 have a generally circular outer profile, as viewed along the longitudinal direction 13.

The connector 26 includes a skirt 74 that extends from the head 70 in the longitudinal direction 13. The skirt 74 may be integrally formed with the second piece 62, or may be a separate piece attached through the use of tabs, adhesives, ultrasonic welding, or the like. The skirt 74 has a distal ring 76 displaced from the head 70. A pair of projections, in the form of deflectable tabs 78, protrude inward from the distal ring 76 and point generally toward the head 70. A plurality of ribs 80 are arranged along the interior surface of the distal ring 76. The operation of the ribs 80 and deflectable tabs 78 will be described in greater detail in connection with FIG. 3.

A shank (not shown) extends from the head 70 and is partially encircled by the skirt 74. The head 70, grips 68, skirt 74, and shank form a main body 82 of the connector 26. An extension 84 of the connector extends from the main body 82 to connect to the electric lines 22. The extension 84 may facilitate gripping and/or attachment of the connector 26 to the inflator 24.

The inflator 24 has a housing 90, which may be constructed of a metal such as steel or aluminum. The inflator 24 also has an initiation assembly 92 retained generally within the housing 90. The initiation assembly 92 includes an initiator (not shown) and a receptacle 94 that receives the connector 26. The receptacle 94 includes a collar 96, which may have a generally annular shape and may be seated directly within the collar. The receptacle 94 also includes a retainer 98 that is designed to retain the connector 26 in a manner that will be described in greater detail in connection with FIG. 3.

As shown, the housing 90 has an initiation end 100 that contains the collar 96. The collar 96 has an inside diameter 102 that generally faces the retainer 98 and an outside diameter (not shown) seated directly in the initiation end 100. The retainer 98 has an inside diameter 104 and an outside diameter 106 that generally faces the collar 96. In this application, "inside diameter" and "outside diameter" do not generally refer to measurements, but rather to surfaces existing on the inside or outside of a member with an annular cross section. Thus, the inside or outside diameter of a part may vary in actual size along the length of the part.

An annular space exists between the inside diameter 102 of the collar 96 and the outside diameter 106 of the retainer 98 to receive the skirt 74 of the connector 26. The retainer 98 has a plurality of splines 108 arrayed about the outside diameter 106. The splines 108 are spaced in a manner that corresponds to the spacing of the ribs 80 to enable rotational locking, as will be described with reference to FIG. 3.

Figure 3:
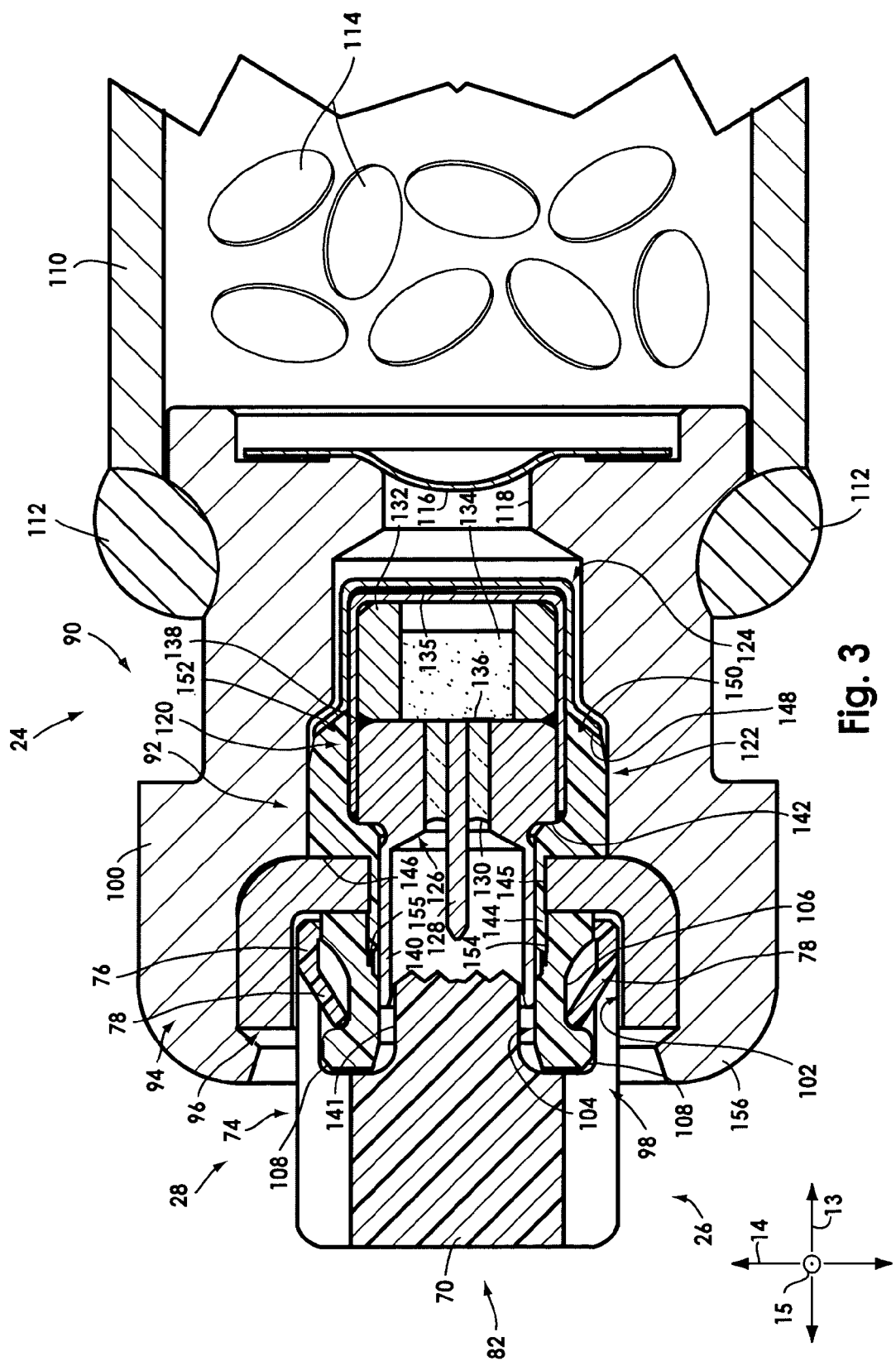
FIG. 3 is a side elevation, section view of the inflation assembly of the airbag module of FIG. 1, with the connector connected to the inflator.

Referring to FIG. 3, a side elevation, section view illustrates the inflation assembly 28 of FIGS. 1 and 2, with a portion of the inflator 24 and a portion of the connector 26 removed for clarity. The connector 26 is shown connected to the inflator 24. As shown, the housing 90 has a containment end 110 in addition to the initiation end 100. The containment end 110 may be attached to the initiation end 100 through the use of a weld 112 or the like. If desired, methods such as TIG welding, inertial welding, or the like may be used to form the weld 112.

The containment end 110 contains a quantity of generant 114 that is combustible to produce inflation gas. The generant 114 is sealed from the initiation assembly 92 via a burst disc 116. The initiation assembly 92 communicates with the burst disc 116 via an initiation passageway 118 formed in the initiation end 100. As mentioned previously, the initiation assembly 92 includes an initiator 120, also known as a "squib," which may be of any type known in the art. The initiator 120 is disposed at one end of the initiation passageway 118.

As shown, the initiator 120 is generally encased by a body 122 and a cover 124. The body 122 and the cover 124 may be formed of similar polymers that can be relatively easily ultrasonically welded together. For example, the body 122 and the cover 124 may be formed of nylon, polyester, polycarbonate, or ULTEM, a polyetherimide manufactured by General Electric Co. The retainer 98 may be formed of the same material to facilitate ultrasonic welding of the retainer 98 to the body 122. The body 122 helps electrically insulate the initiator 120 from the collar 96 and the housing 90.

Ultrasonic welding is only one of several possible methods by which the body 122 and the cover 124 may be attached together. Any other form of vibratory welding may be used. In this application, "vibratory welding" refers to a process by which vibrations are induced along an interface to be welded to cause frictional heating. Hence, ultrasonic welding is one type of vibratory welding. Furthermore, electromagnetic welding, or welding through the application of electromagnetic radiation, may alternatively be used to attach the body 122 and the cover 124 together. Radio frequency welding, also known as "RF welding," is one type of electromagnetic welding.

In this embodiment, the initiation assembly 92 generally includes the initiator 120, the body 122, the cover 124, the retainer 98, and the collar 96. In alternative embodiments, one or more of the above may be omitted from an initiation assembly, and other features such as o-rings or washers may be included. The receptacle 94 generally includes the collar 96, the retainer 98, and the body 122. In alternative embodiments, one or more of the above may be omitted from a receptacle, and other features such as washers may be included.

The initiator 120 includes a header eyelet 126 formed of a conductive metal such as stainless steel. The header eyelet 126 has a generally annular shape. A center pin 128 is centered within the header eyelet 126. In this application, "center pin" refers to a pin that is centered with respect to an axis of symmetry of the initiator.

The center pin 128 may be formed of a glass-to-metal sealable steel such as an AISI 52-series alloy or a nickel-chromium alloy such as inconel. The center pin 128 is electrically insulated from the header eyelet 126 by an annular seal 130, which may be formed of a glass material attached to the center pin 128 and/or the header eyelet 126 by known glass-to-metal attachment techniques.

The initiator 120 also includes a charge holder 132 disposed adjacent to the header eyelet 126. The charge holder 132 contains a quantity of ignition material 134, which may be a pyrotechnic material known in the art. The charge holder 132 and the ignition material 134 may be contained within a cup 135 having a comparatively thin wall formed of stainless steel or the like. A bridge wire 136 is attached to extend radially along the annular seal 130 to electrically couple the header eyelet 126 to the center pin. The charge holder 132 may be attached to the header eyelet 126 via a weld 138 or the like. In the Figures, many welds are symbolically represented as triangles. The welds may, in reality, have any desired shape.

In this application, an "initiator" is a device that includes ignition material, conductors designed to receive an activation signal to initiate ignition of the ignition material, and insulation that provides the conductors with the electrical isolation necessary for conveyance of the activation signal. "Ignition material" is a pyrotechnic material capable of combusting to induce the ignition of inflation gas generant, such as the generant 114 of FIG. 2. Additionally, "ignition material" refers to a material apart from the resistive element used to produce the initial spark, e.g., the bridge wire 136.

When a collision is detected, the activation signal may be transmitted by the ECU 21 to the header eyelet 126 and the center pin 128 via the connector 26. The bridge wire 136 resistance heats and combusts to induce ignition of the ignition material 134. The resulting pressurized, heated gas moves through the initiation passageway 118 to remove or rupture the burst disc 116 and ignite the generant 114, thereby producing inflation gas to fill the cushion 11.

As shown, the header eyelet 126 has a skirt 140 that extends toward the connector 26. The skirt 140 is sized to receive a shank 141 of the connector 26, which extends from within the skirt 74 of the connector 26. The header eyelet 126 also has a shoulder 142 with an annular shape. The shoulder 142 abuts the interior of the body 122 in such a manner that the cover 124 and the body 122 cooperate to securely retain the initiator 120.

The body has a skirt 144 that encircles the greater part of the skirt 140 of the header eyelet 126. The skirt 144 is thus effectively sandwiched between the skirt 140 and a press fit portion 145 of the inside diameter 102 of the collar 96. The body 122 also has an outward shoulder 146 that abuts the collar 96 and an inward shoulder 148 attached to the cover 124. In this application, "inward shoulder" and "outward shoulder" generally refer to the position of the shoulder with respect to the burst disc 116. A shoulder closer to the burst disc 116 is the inward shoulder. If desired, the body 122 may be sized to provide a press fit with the initiation end 100 of the housing 90 between the outward and inward shoulders 146, 148.

As mentioned previously, the cover 124 is ultrasonically welded to the body 122 to generally encase the initiator 120. More specifically, the cover 124 has a rim 150 with a generally flared shape that matches the shape of the inward shoulder 148. An ultrasonic weld 152 is formed between the rim 150 and the inward shoulder 148. The ultrasonic weld 152 may be formed by passing a horn adjacent to the rim 150 and emitting ultrasonic radiation from the horn toward the rim 150 and the inward shoulder 148.

The inside diameter 104 of the retainer 98 is generally sized to receive the skirt 140 of the header eyelet 126. The inside diameter 104 also has an enlarged portion 154 sized to receive the skirt 144 of the body 122. The skirt 144 is ultrasonically welded to the enlarged portion 154 to attach the retainer 98 to the body 122. A crimped lip 156 of the initiator end 100 of the housing 90 retains the collar 96, and thence, the entire initiation assembly 92.

In order to connect the connector 26 to the inflator 24, the shank 141 is inserted into the skirt 140 of the header eyelet 126 and the distal ring 76 of the skirt 74 of the connector 26 is inserted into the annular gap between the retainer 98 and the collar 96. As the distal ring 76 enters the annular gap, the splines 108 operate to deflect the deflectable tabs 78 into near alignment with the longitudinal direction 13. As the deflectable tabs 78 slide past the splines 108, the ribs 80 engage the splines 108.

As mentioned previously, the ribs 80 and the splines 108 are relatively spaced to mesh together. The ribs 80 and/or the splines 108 may be beveled to facilitate meshing. Several splines 108 are present. The splines 108 may range in number from six to thirty. Further, the splines 108 may range in number from twelve to twenty. Yet further, the splines 108 may range in number from fifteen to eighteen. In any case, enough splines 108 are present to provide more than two different orientations, but not an infinite number of orientations, in which the connector 26 can be inserted into the receptacle 94. An installer thus need only rotate the connector 26 by a comparatively small maximum angle to permit the splines 108 and the ribs 80 to mesh.

In the context of connector installation, "orientation" generally refers to the rotational position of a connector, about an axis extending in the longitudinal direction 13, with respect to the associated inflator. "Rotation between orientations" in the post-assembly context thus refers to relative rotation between the connector and the inflator about an axis extending in the longitudinal direction 13, without removal of the connector from the inflator.

When the splines 108 and the ribs 80 mesh, the skirt 74 may be further inserted into the annular gap between the retainer 98 and the collar 96 until the deflectable tabs 78 have slid clear of the splines 108. The deflectable tabs 78 then snap back toward their undeflected positions to reach the state illustrated in FIG. 3. By this point, electrical contact has been made between conductors (not shown) on the shank 141 and the header eyelet 126 and the center pin 128. The deflectable tabs 78 cannot be nondestructively withdrawn past the splines 108. Thus, the connector 26 is nonremovably, or nonserviceably, connected to the inflator 24. "Nonremovable" connection refers to connection in which the parts cannot be easily and nondestructively disconnected from each other.

The inflator 24 may be manufactured in a variety of ways. According to one example, the retainer 98, the body 122, and the cover 124 are formed from similar polymers via injection molding or the like. The initiator 120 is manufactured using methods known in the art. The collar 96 is made of stainless steel by a method such as stamping. Alternatively, the collar 96 may be constructed of a powdered material that is pressed and sintered to provide the desired shape. The initiation and containment ends 100, 110 of the housing 90 may also be formed from steel using methods such as casting, stamping, or machining.

The skirt 144 of the body 122 may be inserted into the inside diameter 102 of the collar 96 by, for example, fixturing the body 122, pressing the collar 96 onto the protruding skirt 144, and withdrawing the collar 96 to withdraw the body 122 from the fixturing arrangement. If desired, a press fit may exist between the skirt 144 and the press fit portion 145 of the inside diameter 102. The orientation of the body 122 with respect to the collar 96, about an axis extending in the longitudinal direction 13 is arbitrary; hence, no orientation step need be performed. Indeed, as with several other embodiments, the entire initiation assembly 92 may be assembled without rotating the body 122, the cover 124, the initiator 120, the retainer 98, or the collar 96 about the longitudinal direction 13 to any specific orientation. This benefit is obtained via the rotational symmetry of the initiation assembly 92 about the longitudinal direction 13.

The retainer 98 is then positioned such that the enlarged portion 154 encircles the skirt 144 of the body 122, and the retainer 98 is ultrasonically welded to the skirt 144. The skirt 140 of the header eyelet 126 is then inserted into the skirt 144 of the body 122 to position the initiator 120 partially within the body 122, as shown. The cover 124 is then disposed to cover the cap 135 such that the rim 150 abuts the inward shoulder 148, and the rim 150 is ultrasonically welded to the inward shoulder 148 in the manner described previously.

The retainer 98, the body 122, the initiator 120, and the cover 124 are all secured to the collar 96 to provide the initiation assembly 92. The initiation assembly 92 is then inserted into the initiation end 100 of the housing 90 of the inflator 24 such that the initiator 120 protrudes into the initiation passageway 118. The initiation end 100 is crimped to form the crimped lip 156 that retains the collar 96, and thence, the entire initiation assembly 92.

The inflation assembly 28 of FIGS. 1, 2, and 3 is only one of many possible embodiments of the invention. Those of skill in the art will recognize the existence of a wide variety of alternative embodiments. Some such alternative embodiments will be shown and described in connection with FIGS. 4 through 19e, as follows.

Figure 4:
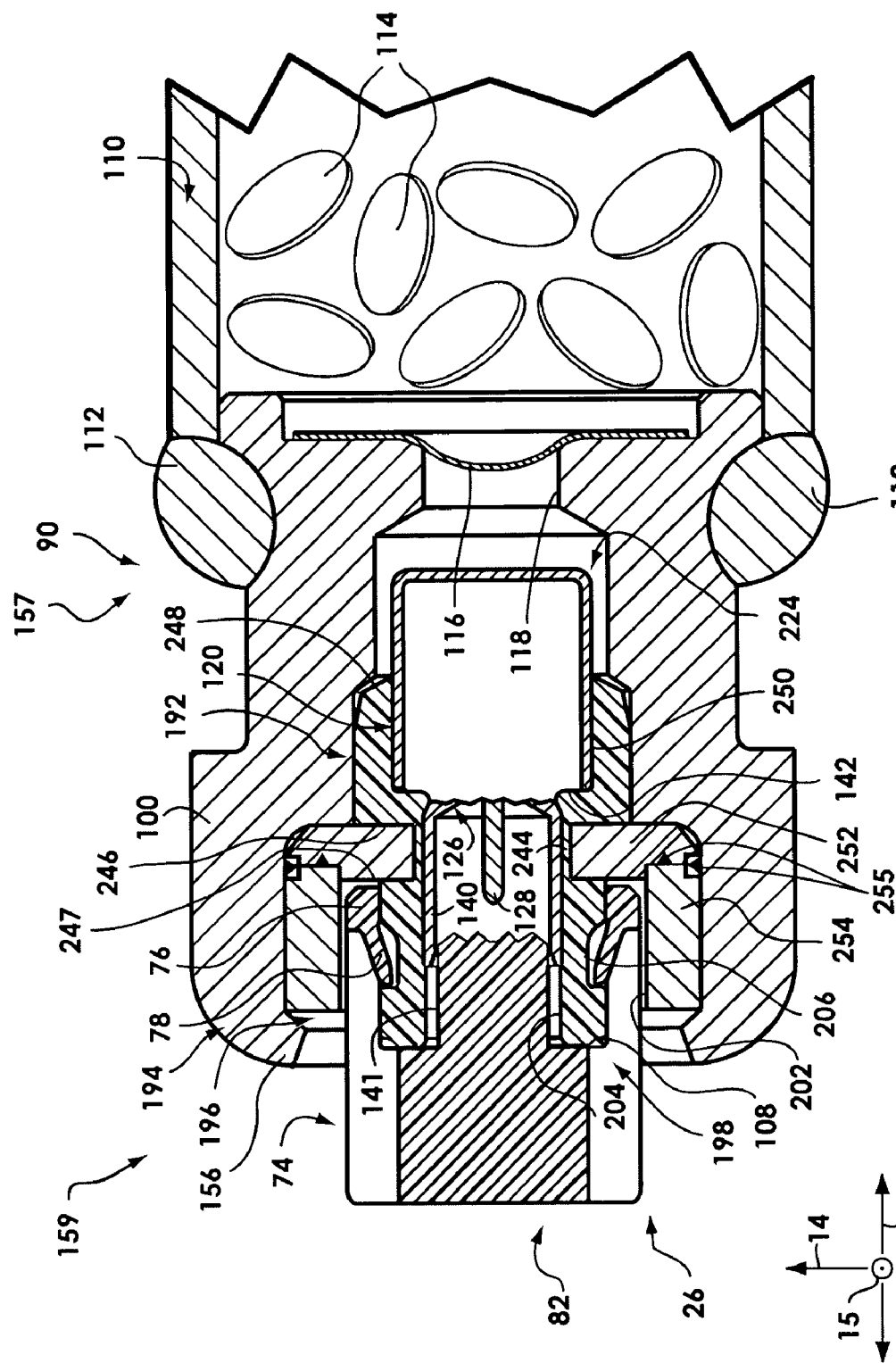
FIG. 4 is a side elevation, section view of an inflation assembly according to an alternative embodiment of the invention, with the connector connected to the inflator.

Referring to FIG. 4, a side elevation, section view illustrates the connector 26 of FIG. 1, used in conjunction with an inflator 157 to provide an inflation assembly 159 according to one alternative embodiment of the invention. The inflator 157 has a housing 90 with an initiation end 100 and a containment end 110, like those of the previous embodiment. The inflator 157 also has an initiation assembly 192, which includes an initiator 120 like that illustrated above and a receptacle 194 designed to receive the connector 26. The components of the initiator 120 are as shown in FIG. 3, and have fully or partially been cut away for the sake of clarity.

The initiation assembly 192 includes a collar 196, which may be constructed of multiple pieces, as will be described subsequently. Additionally, the initiation assembly 192 includes a retainer/body 198, which has the integrated general structure and function of the body 122 and the retainer 98 illustrated in FIG. 3. The collar 196 has an inside diameter 202. The retainer/body 198 has an inside diameter 204 and an outside diameter 206.

The initiation assembly 192 also includes a cover 224 configured differently from the cover 124 of FIG. 3. The cover 224 is attached to the retainer/body 198 in a manner that will be described subsequently. The retainer/body 198 has a bridge 244 seated within the inside diameter 202 of the collar 196. The retainer/body 198 also has an outward shoulder 246 and a retention shoulder 247 that face each other and sandwich a portion of the collar 196 between them. The body 122 also has an inward shoulder 248 disposed adjacent to the initiation end 100 of the housing 90. The body 122 may, if desired, be sized to provide a press fit between the body 122 and the initiation end 100 of the housing 90 between the outward and inward shoulders 246, 248.

The collar 196 has a first piece 252 and a second piece 254. The first piece 252 is shaped to generally form a washer, and is sandwiched and retained between the outward shoulder 246 and the retention shoulder 247. The second piece 254 has a more elongated annular shape, within which the inside diameter 202 is larger than within the first piece 252. The first and second pieces 252, 254 are attached together via welds 255 or the like.

Connection of the connector 26 to the inflator 157 is similar to that described previously, in connection with the inflation assembly 28 of FIGS. 1, 2, and 3. Manufacture of the inflator 157 is, however, somewhat different than that of the inflator 24 of the previous embodiment.

More precisely, the cover 224 may be positioned around the end of the initiator 120, as illustrated. The body/retainer 198 may then be insert molded around the initiator 120, the cover 224, and the first piece 252 of the collar 196. The second piece 254 may then be attached to the first piece 252 to form the completed collar 196. The retainer/body 198, the cover 224, and the initiator 120 are then attached to the collar 196 to form the assembled initiation assembly 192. The initiation assembly 192 may be inserted into the initiation end 100 and retained via formation of a crimped lip 156 in much the same manner as the previous embodiment.

The inflation assemblies 28, 159 of FIGS. 1–4 are nonserviceable; i.e., they cannot easily be nondestructively disconnected. Some manufacturers may prefer the option of servicing the inflator or electrical system of an airbag module, and may thus desire an inflation assembly that can be relatively easily disconnected. Two such inflation assemblies will be shown and described in connection with FIGS. 5–7.

Figure 5:
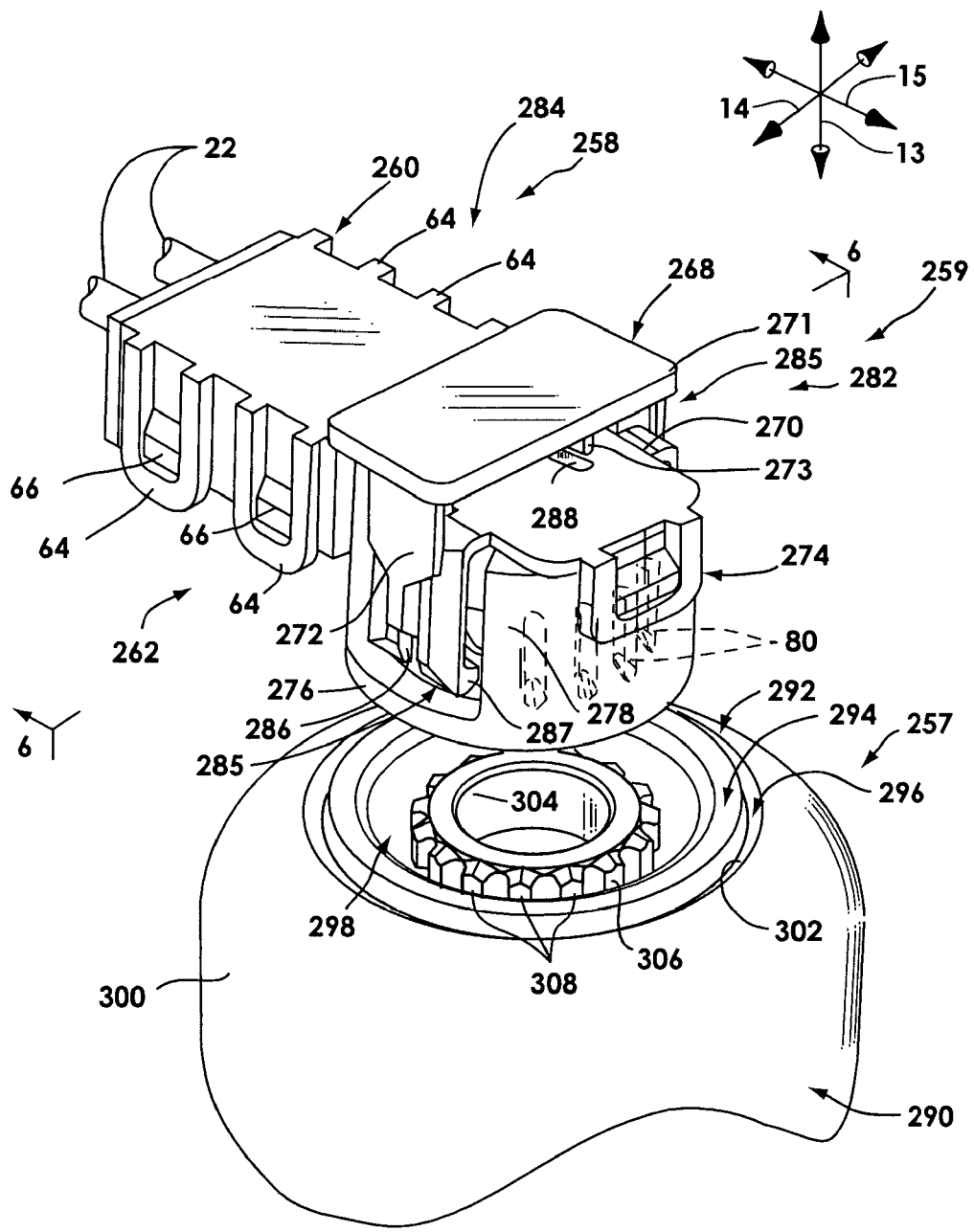
FIG. 5 is a perspective view of an inflation assembly according to another alternative embodiment of the invention, with the connector disconnected from the inflator.

Referring to FIG. 5, a perspective view illustrates an inflator 257 and a connector 258 that cooperate to provide an inflation assembly 259 according to another alternative embodiment of the invention. As illustrated, the connector 258 is not connected to the inflator 257.

The connector 258 has a first piece 260 and a second piece 262, which are connected together through the use of brackets 64 and tabs 66, like the first and second pieces 60, 62 illustrated in FIG. 2. The connector 258 also comprises a locking bracket 268 that is movable with respect to a head 270 of the connector 258 to enable the connector 258 to be locked in place or released from the inflator 257 as desired. The locking bracket 268 may be termed a "connector position assurance," or CPA, feature.

The locking bracket 268 has a head plate 271, a pair of locking arms 272 that extend generally perpendicular to the head plate 271 alongside the head 270, and a shorting rib 273 that extends from the head plate 271 toward the head 270. The operation of the locking bracket 268 will be described in greater detail in connection with FIG. 6.

The connector 258 has a skirt 274 that extends from the head 270, and may be integrated with the second piece 262. The skirt 274 may alternatively be a separate piece. The skirt 274 has a distal ring 276 somewhat similar to the distal ring 274 of the connector 26. However, no deflectable tabs extend from the distal ring 276. Rather, openings 278 are present on either side of the skirt 274. A shank (not shown) extends from within the skirt 274. The skirt 274, the shank, and the head 270 generally form a main body 282 of the connector 258. An extension 284 extends from the main body 282 to connect to electric lines 22.

Flexible arms 285 extend from the head 270, inward of the locking arms 272 of the locking bracket 268. The flexible arms 285 have a cross sectional shape selected to permit elastic bending. Each of the flexible arms 285 has a slot 286 within which the corresponding locking arm 272 rides. Additionally, each flexible arm 285 has a projection in the form of an enlarged end 287 that extends inward. The enlarged ends 287 bridge the slots 286 at the ends of each of the flexible arms 285. A slot 288 is formed in the head 270 in alignment with the shorting rib 273.

The inflator 257 has a housing 290 containing an initiation assembly 292. The initiation assembly 292 includes an initiator (not shown) and a receptacle 294 designed to receive the connector 258. The receptacle 294 includes a collar 296 and a retainer 298. The collar 296 is seated directly in an initiation end 300 of the housing 290 of the inflator 257. The collar 296 has an inside diameter 302 that generally faces the retainer 298. The retainer 298 has an inside diameter 304 and an outside diameter 306 that generally faces the collar 296. A plurality of splines 308 are arrayed about the outside diameter 306 of the retainer 298.

According to one alternative, the collar 296 need not be used. Rather, the structure of the collar 296 may be integrally formed with the initiation end 300 to decrease the part count and assembly complexity of the inflator 257. In many of the embodiments illustrated herein, the collar structure may be formed as an integral part of the inflator housing. However, FIG. 6 assumes the existence of a separate collar 296 in the inflator 257, as illustrated in FIG. 5.

Figure 6:
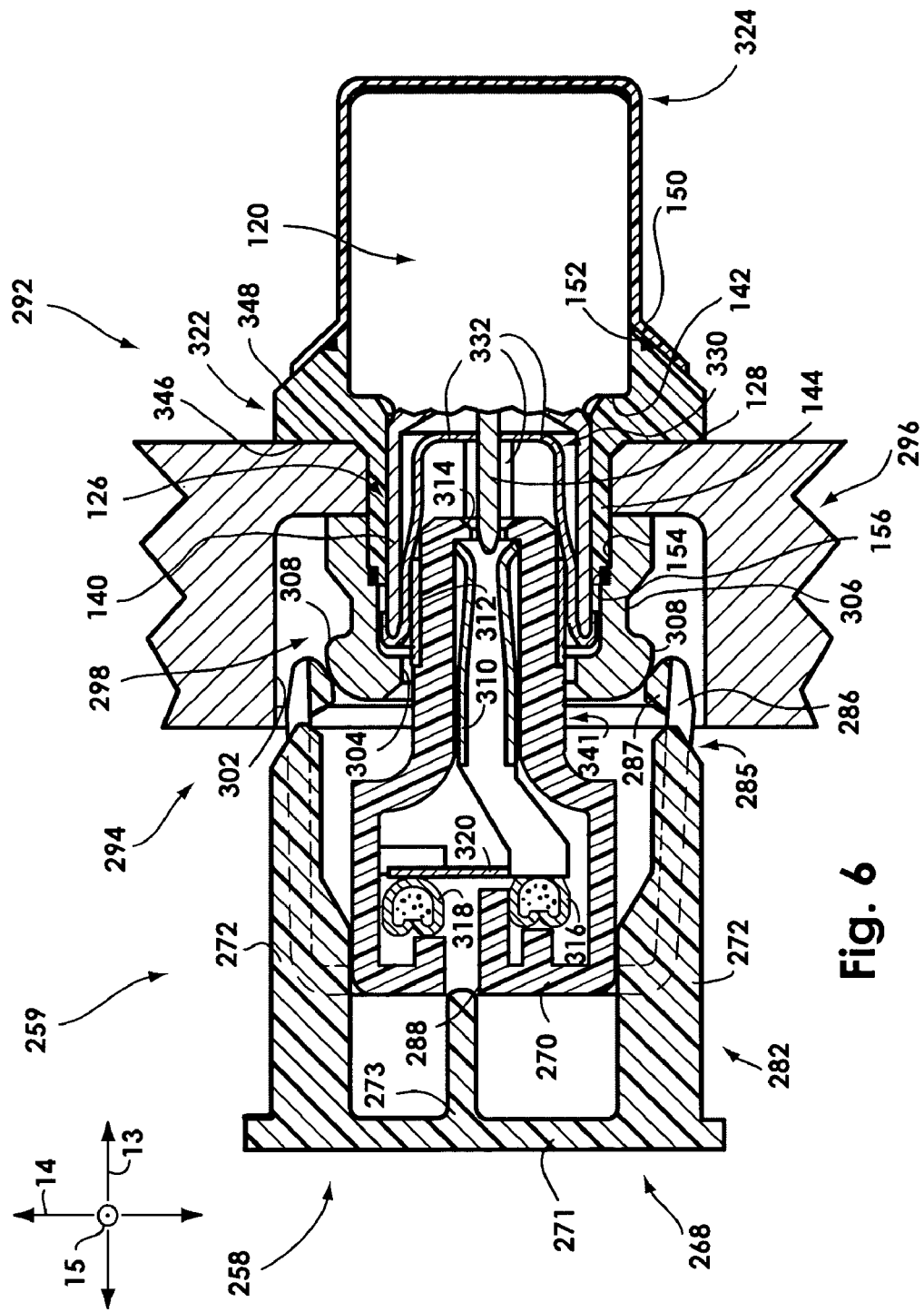
FIG. 6 is a side elevation, section view of the inflation assembly of FIG. 5, with the connector partially connected to the inflator.

Referring to FIG. 6, a side elevation, section view illustrates the inflation assembly 259 of FIG. 5. The components of the inflator 257 outside the initiation assembly 292 have been omitted for clarity; they may be somewhat similar to their counterparts as illustrated in FIGS. 3 and 4. A portion of the collar 296 is also shown cut away. The initiator 120 is similar to that of the previous embodiments; some components of the initiator 120 have been filly or partially obscured for clarity.

The connector 258 has a central contact 310 and a peripheral contact 312 that are designed to electrically communicate with the header eyelet 126 and the center pin 128. More precisely, the central contact 310 may have two or more bent metal strips that press against the center pin 128 when the center pin 128 is inserted through a central opening 314 of the main body 282. The peripheral contact 312 has a generally annular shape that makes electrical contact with the skirt 140 of the header eyelet 126 in a manner that will be described subsequently.

The connector 258 also has a first internal conductor 316 electrically coupled to the center contact 310 and a second internal conductor 318 electrically coupled to the peripheral contact 312. A shunting bar 320 is fixed in electrical contact with the first internal conductor 316, and extends toward the second internal conductor 318. The shunting bar 320 is biased to rest naturally against the second internal conductor 318 to provide electrical contact between the first and second internal conductors 318, and thence, between the central contact 310 and the peripheral contact 312. The shunting bar 320 prevents accidental transmission an activation signal via static discharge or the like by electrically coupling the central contact 310 to the peripheral contact 312 until the connector 258 is securely retained by the receptacle 294.

The initiation assembly has an initiator 120 like those of the previous embodiments. The initiator 120 is generally encased within a body 322 and a cover 324. As in previous embodiments, the initiator 120 has a header eyelet 126 and a center pin 128. The header eyelet 126 has a skirt 140.

A shunting clip 330 is disposed generally within the skirt 140. The shunting clip 330 includes a plurality of resilient arms 332 that grip the edges of the skirt 140 and extend inward to make contact with the center pin 128. The resilient arms 332 are bendable away from the center pin 128 to accommodate a shank 341 of the connector 258, on which the central contact 310 and the peripheral contact 312 are disposed. The shunting clip 330 thus operates to prevent an electrical potential from being applied between the center pin 128 and the header eyelet 126 when the connector 258 is not connected. Thus, static discharges and the like are unable to accidentally trigger deployment of the inflator 257. In alternative embodiments, the shunting clip 330 may be integrated with the header eyelet 126.

The body 322 has a skirt 144, an outward shoulder 346, and an inward shoulder 348. The outward shoulder 346 abuts the collar 296 and the inward shoulder 348 is ultrasonically welded to a rim 150 of the cover 324 by an ultrasonic weld 152. The retainer 298 is ultrasonically welded to the skirt 144 of the body 322 via an ultrasonic weld 156.

The locking bracket 268 has an unlocked position in which the flexible arms 285 are able to flex relatively freely to permit insertion or withdrawal of the connector 258 into or out of the receptacle 294. The locking bracket 268 also has a locked position in which flexure of the flexible arms 285 is restricted to prevent insertion or withdrawal of the connector 258 into or out of the receptacle 294. FIG. 6 illustrates the unlocked position.

The connector 258 may be easily connected to the inflator 257. The locking bracket 286 is first disposed in the unlocked position, as shown in FIG. 6. The shank 341 is then inserted into the skirt 140 of the header eyelet 126. As the shank 341 enters the skirt 140, the peripheral contact 312 abuts the resilient arms 332 of the shunting clip 330 and bends the resilient arms 332 such that the resilient arms 332 lie generally parallel to the skirt 140. Thus, the resilient arms 332 are removed from electrical communication with the center pin 128 to permit the activation signal to be transmitted to the initiator 120.

As shown, in the unlocked position, the locking arms 272 of the locking bracket 268 are clear of the enlarged ends 287 of the flexible arms 285. Thus, the locking arms 272 permit the flexible arms 285 to flex outward, as illustrated, to permit passage of the enlarged ends 287 past the splines 308. The skirt 274 has been omitted for clarity. As the enlarged ends 287 slide past the splines 308, the ribs 80 mesh with the splines 308. This may require some minor rotation of the connector 258. The enlarged ends 287 are then able to slide clear of the splines 308 and snap inward to a less deflected state.

Once the enlarged ends 287 have cleared the splines 308, the locking bracket 268 may be moved to the locked position. The locking arms 272 then slide along the slots 286 of the flexible arms 285 until the ends of the locking arms 272 are disposed outside the enlarged ends 287 of the flexible arms 285. The locking arms 272 then block outward flexure of the flexible arms 285 to keep the connector 258 from being withdrawn from the receptacle 294 without deliberate movement of the locking bracket 268 back to the unlocked position.

In the unlocked position, the shorting rib 273 is disposed generally outside the slot 288. When the locking bracket 268 is moved to the locked position, the shunting rib 273 protrudes into the slot 288 of the head 270 to induce flexure of the shunting bar 320 away from the second internal conductor 318. Thus, the central contact 310 is no longer electrically coupled to the peripheral contact 312, except via the bridge wire 136 (shown in FIG. 3). The activation signal can then be transmitted from the connector 268 to the initiator 120 to initiate deployment of the inflator 257.

The connector 258 may be relatively easily removed from the receptacle 294 for servicing. The locking bracket 268 is first moved to the unlocked position. The shunting bar 320 again makes contact with the second internal conductor 318 to prevent accidental deployment of the inflator 257. The flexible arms 285 are again able to flex outward to permit the enlarged ends 287 to slide past the splines 308. As the shank 341 is removed from within the skirt 140 of the header eyelet 126, the resilient arms 332 return to the positions illustrated in FIG. 6 to make electrical contact with the center pin 128. Thus, accidental deployment of the inflator 257 is further prevented.

The collar 296, body 322, cover 324, initiator 120, and retainer 298 of the inflator 257 may be manufactured by methods described previously, in connection with previous embodiments. Assembly of the inflator 257 may be carried out by inserting the skirt 144 of the body 322 into the collar 296, for example, by fixturing the body 322 as described above. The shunting clip 320 is coupled to the skirt 140 of the header eyelet 126. The retainer 298 is then ultrasonically welded to the body 322. The initiator 120 is inserted into the body 322 and the cover 324 is positioned and ultrasonically welded to the body 322. The completed initiation assembly 292 can then be installed in the housing 90 by seating the collar 296 in the initiation end 300.

The receptacle 294 of FIGS. 5 and 6 is similar in overall shape to the receptacles 94, 194 of FIGS. 2 through 4. Hence, the receptacle 294 may also receive a nonserviceable connector such as the connector 26 illustrated in FIG. 2. Similarly, the receptacles 94, 194 may receive a serviceable connector like the connector 258 of illustrated in FIG. 5. The shunting clip 330 is operable with nonserviceable and serviceable connectors, and may be used in either type of inflation assembly.

Consequently, the choice of whether to use a serviceable connector or a nonserviceable connector may be made independently of the specific inflator model. Separate inflators need not be made for serviceable and nonserviceable installations; rather, one interchangeably connectible inflator is used and only the connector need be different.

The inflation assembly 259 utilizes a shunting bar 320 and a shunting clip 330 to prevent accidental deployment. However, if desired, a serviceable connector according to the invention may omit one or both of the shunting bar 320 and the shunting clip 330. Such a choice may also be made by the customer without changing many aspects of the inflation assembly 259.

According to another alternative, a retainer according to the invention may have inward-oriented splines instead of outward-oriented splines. One example of such a retainer configuration will be shown and described in connection with FIG. 7.

Figure 7:
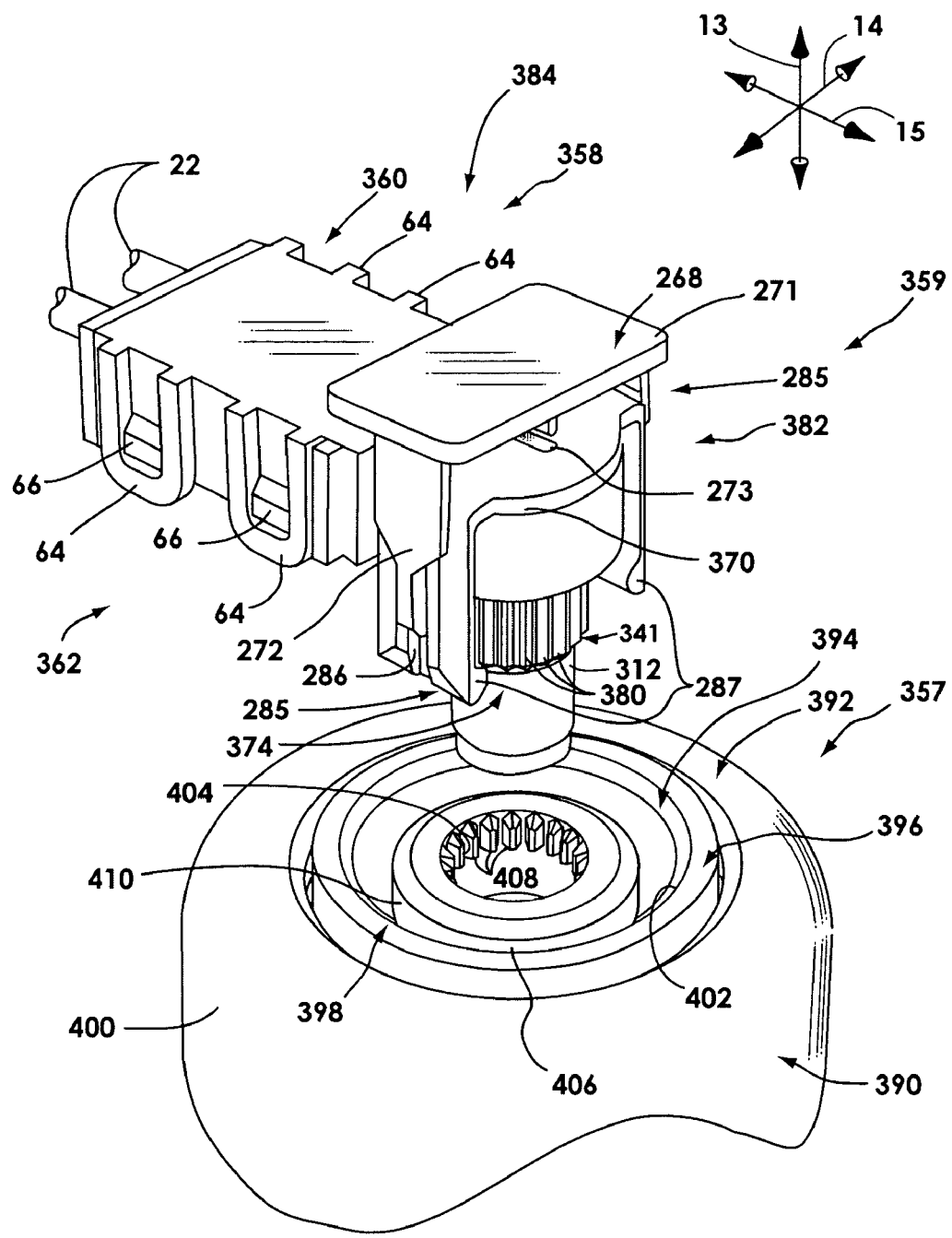
FIG. 7 is a perspective view of an inflation assembly according to another alternative embodiment of the invention, with the connector disconnected from the inflator.

Referring to FIG. 7, a perspective view illustrates an inflator 357 and a connector 358, which form an inflation assembly 359 according to an alternative embodiment of the invention. As shown, the connector 358 has a first piece 360 attached to a second piece 362 through the use of a plurality of brackets 64 and tabs 66, as described in connection with previous embodiments.

The connector 358 has a head 370 and a locking bracket 268 like that of the previous embodiment. The locking bracket 268 has a head plate 271, two locking arms 272, and a shunting rib 273. As in the previous embodiment, two flexible arms 285 extend from the head 370. Each of the flexible arms 285 has a slot 286 and an enlarged end 287.

In place of the skirt 274 of the previous embodiment, the connector 358 has a locking ridge 374 extending from the head 370. A plurality of ribs 380 are arrayed around the locking ridge 374. The ribs 380 extend outward from the locking ridge 374. The connector 358 has a shank 341 that extends from the locking ridge 374. The connector 358 has a main body 382 that generally includes the head 370, the locking ridge 374, and the shank 341. The connector 358 also has an extension 384 that connects the main body 382 to the electric lines 22.

The inflator 357 has a housing 390 that contains an initiation assembly 392. The initiation assembly 392 includes a receptacle 394 designed to receive the connector 358. The receptacle 394 includes a collar 396 and a retainer 398. The housing 390 has an initiation end 400 in which the collar 396 is seated. The collar 396 has an inside diameter 402. The retainer 398 has an inside diameter 404 and an outside diameter 406. A plurality of splines 408 are arrayed around the inside diameter 404 of the retainer 398. The splines 408 are spaced to mesh with the ribs 380 of the connector 358. A lip 410 is formed in the outside diameter 406 of the retainer 398.

The initiation assembly 392 may otherwise be structured in a manner similar to the initiation assembly 392 of FIGS. 5 and 6. Assembly of the inflator 357 is thus similar to that described in connection with the previous embodiment. Connection of the connector 358 to the inflator 357 is thus performed in a manner similar to that described in connection with the previous embodiment.

More precisely, with the locking bracket 268 in the unlocked position, the enlarged ends 287 of the flexible arms 285 are inserted into the annular gap between the collar 396 and the retainer 398. The shank 341 is inserted into engagement with an initiator (not shown) of the initiation assembly 392. The flexible arms 285 flex to permit the enlarged ends 287 to slide past the lip 410. Meanwhile, the connector 358 may be rotated slightly with respect to the inflator 357 to cause the splines 408 to mesh with the ribs 380.

In this application, "engagement" refers to physical contact or interconnection. A part that engages another part need not necessarily "retain" the second part. "Retention" refers to a part that physically interferes with removal of another part from some type of engagement.

When the splines 408 and ribs 380 mesh, the enlarged ends 287 may be moved past the lip 410 to allow each of the flexible arms 285 to snap back to a relatively undeflected position. The locking bracket 268 is then moved to the locked position to lock the connector 358 in place and remove protective shunting from the inflation assembly 359.

As illustrated by the inflation assembly 359, a retainer may have inward-oriented splines, a connector may have corresponding outward-oriented ribs. The result is possible simplification of the connector. However, one drawback is the presence of a smaller area along which the ribs must undergo shearing failure to permit rotation of the connector with respect to the inflator.

According to other alternative embodiments, a retainer of the general type illustrated in FIGS. 2 through 7 may be omitted. Instead, splines or other orientational locking features maybe disposed on a collar, inflator housing, or washer. Several such embodiments will be shown and described in connection with FIGS. 8 through 16, as follows.

Figure 8:
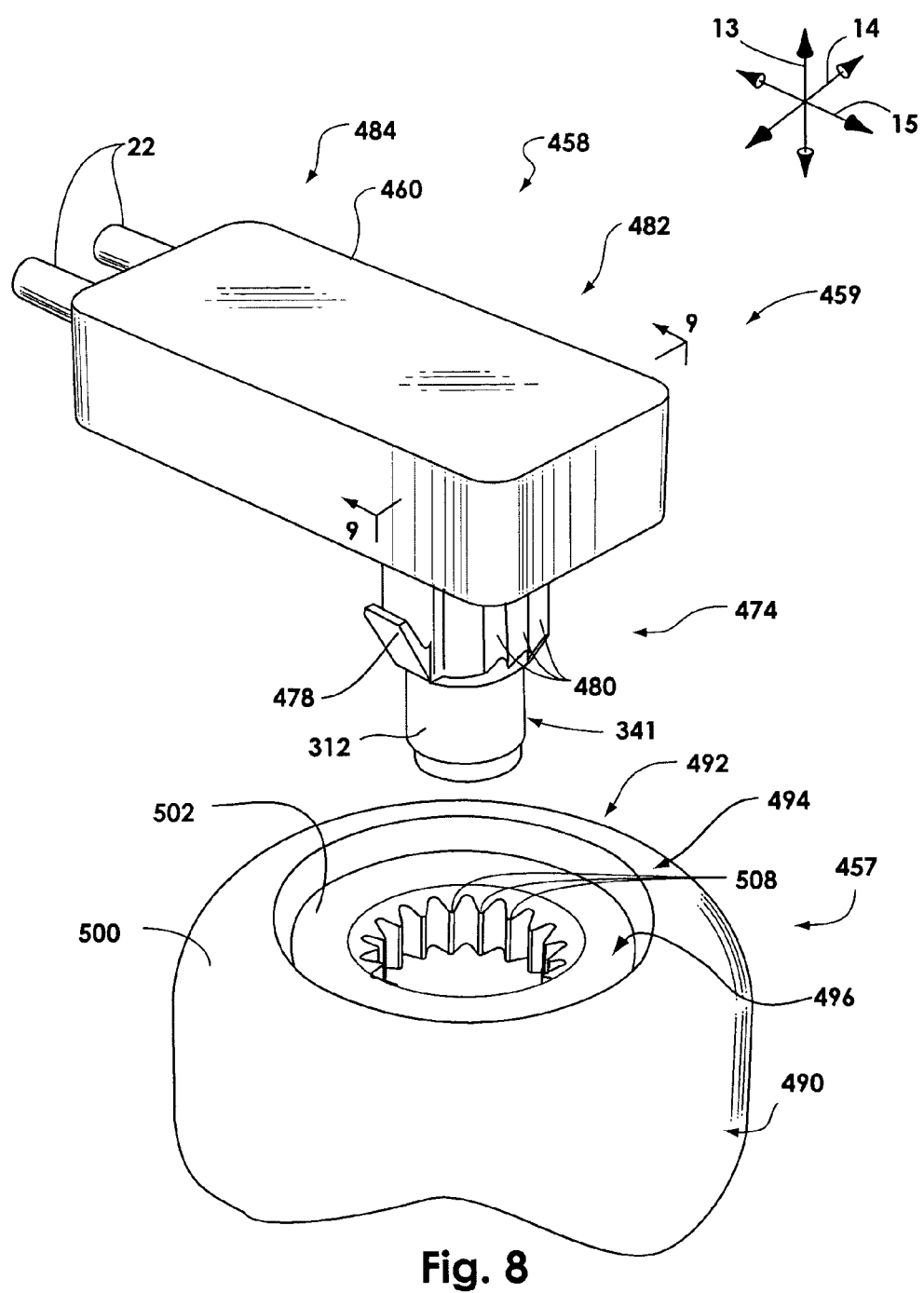
FIG. 8 is a perspective view of a connector and a portion of an inflator according to another alternative embodiment of the invention, with the connector disconnected from the inflator.

Referring to FIG. 8, a perspective view illustrates an inflator 457 used in conjunction with a connector 458 to provide an inflation assembly 459 according to another embodiment of the invention. The connector 458 is shown disconnected from the inflator 457.

As shown, the connector 458 has a housing 460 from which a locking extension 474 protrudes. The locking extension 474 may or may not be integrally formed with the housing 460. As shown, two projections, in the form of deflectable tabs 478, extend outward from the locking extension 474. Additionally, a plurality of ribs 480 are arrayed about a portion of the locking extension 474. The locking extension 474 and the adjoining portion of the housing 460 form a main body 482 of the connector 458. An extension 484 extends from the main body 482 to the electric lines 22.

The inflator 457 has a housing 490 that contains an initiation assembly 492. The initiation assembly 492 includes a receptacle 494 designed to receive the connector 458. The receptacle 494 includes a collar 496 seated directly in an initiation end 500 of the housing 490. However, no retainer like that of the previous embodiments is used. Rather, the collar 496 has an inside diameter 502 about which a plurality of splines 508 are formed. The deflectable tabs 478 of the connector 458 interlock with the collar 496 to lock the connector 458 in engagement with the inflator 457 in a manner that will be described in connection with FIG. 9.

Figure 9:
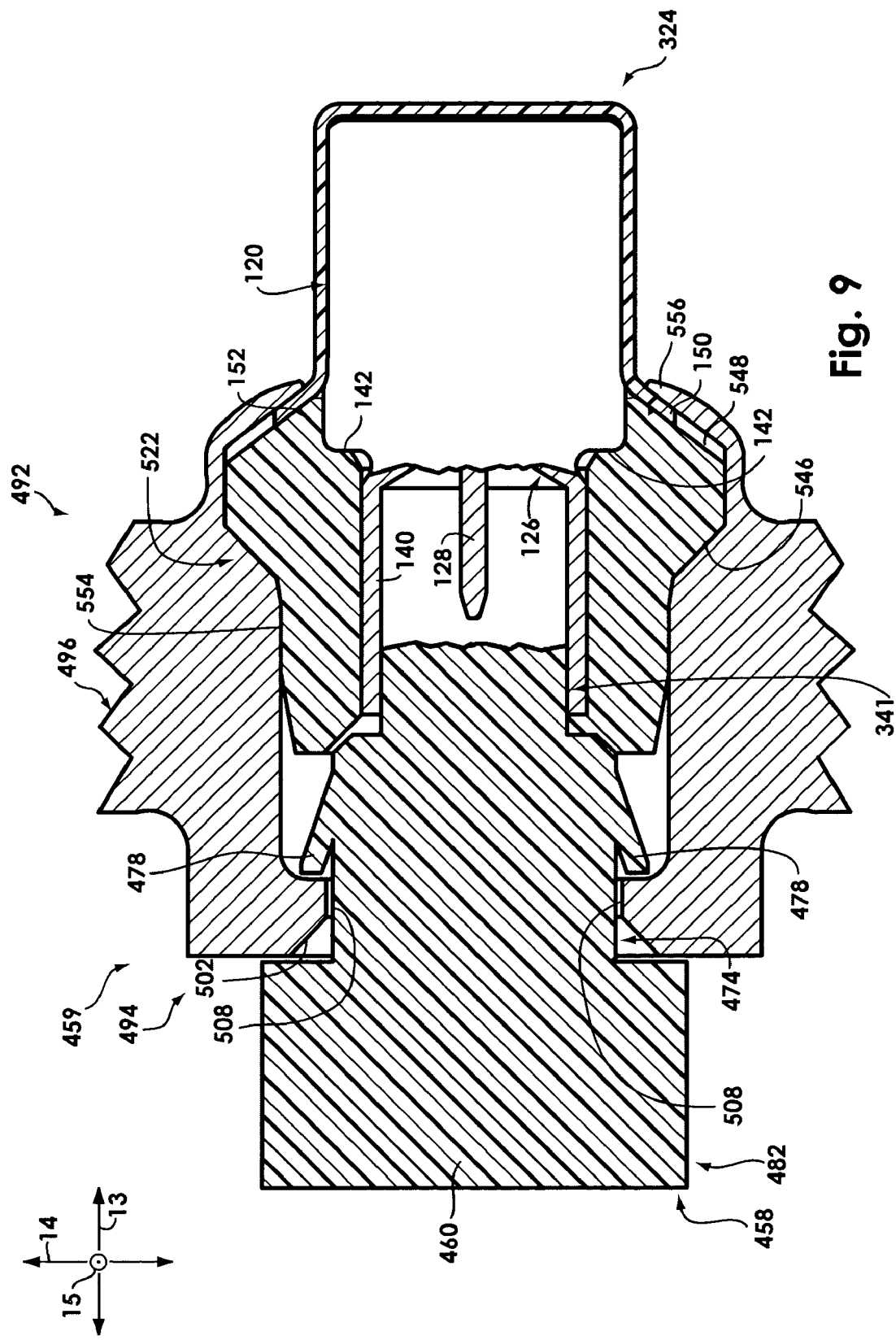
FIG. 9 is a side elevation, section view of the inflation assembly of FIG. 8, with the connector connected to the inflator.

Referring to FIG. 9, a side elevation, section view illustrates the inflation assembly 459 of FIG. 8, with only the initiation assembly 492 of the inflator 457 shown. The initiation assembly 492 includes an initiator 120 similar to those of the previous embodiments. Furthermore, the initiation assembly 492 includes a body 522 designed to cooperate with a cover 324 like that of FIG. 6 to generally encase the initiator 120.

The body 522 has an outward shoulder 546 and an inward shoulder 548. The outward shoulder 546 abuts the inside diameter 502 of the collar 496. The inward shoulder 548 abuts a rim 150 of the cover 324, which is attached to the inward shoulder 548 via an ultrasonic weld 152. The body 522 also has a press fit portion 554 outward of the outward shoulder 546. The press fit portion 554 is sized to be compressed into the collar 496 to provide a seal against moisture entry or compressed gas escape through the region between the body 522 and the collar 496, i.e., the region encircling the body 522. The collar 496 includes a crimped lip 556 that grips the rim 150 of the cover 324 to retain the initiator 120, the body 522, and the cover 324.

Connection of the connector 458 to the inflator 457 may be easily accomplished. According to one exemplary connection method, the locking extension 474 is inserted into the collar 496 and the shank 341 is inserted into the skirt 140 of the header eyelet 126 of the initiator 120. The deflectable tabs 478 deflect to an orientation nearly aligned with the longitudinal direction 13 to slide past the splines 508 of the inside diameter 502 of the collar 496. Meanwhile, the ribs 480 of the connector 458 move into engagement with the splines 508 in the inside diameter 502 of the collar 496. As with the previous embodiments, this may require some rotation of the connector 458 with respect to the inflator 457.

When the splines 508 and the ribs 480 are rotationally aligned, they mesh to permit the deflectable tabs 478 to pass clear of the splines 508. The deflectable tabs 478 then snap back to a less deflected state, as illustrated in FIG. 9, in which the deflectable tabs 478 are able to abut the interior of the collar 496 to prevent withdrawal of the connector 458 from the receptacle 494. The shank 341 is then disposed mostly within the skirt 140 of the header eyelet 126 so that the connector 458 is in electrical communication with the initiator 120. As with the embodiments of FIGS. 1 through 4, the connector 458 is of a nonserviceable type, and therefore may not easily be removed from the receptacle 494 in a nondestructive fashion.

The initiation assembly 492 may be assembled in a variety of ways. According to one example, the body 522 is first seated in the collar 496 as described above, in connection with previous embodiments. The press fit portion 554 tightly engages the inside diameter 502 of the collar 496. The initiator 120 is then inserted into the body 522; this may also require a press fit. The cover 324 is ultrasonically welded to the body 522. The collar 496 is then crimped to retain the cover 324, the body 322, and the initiator 120.

Figure 10:
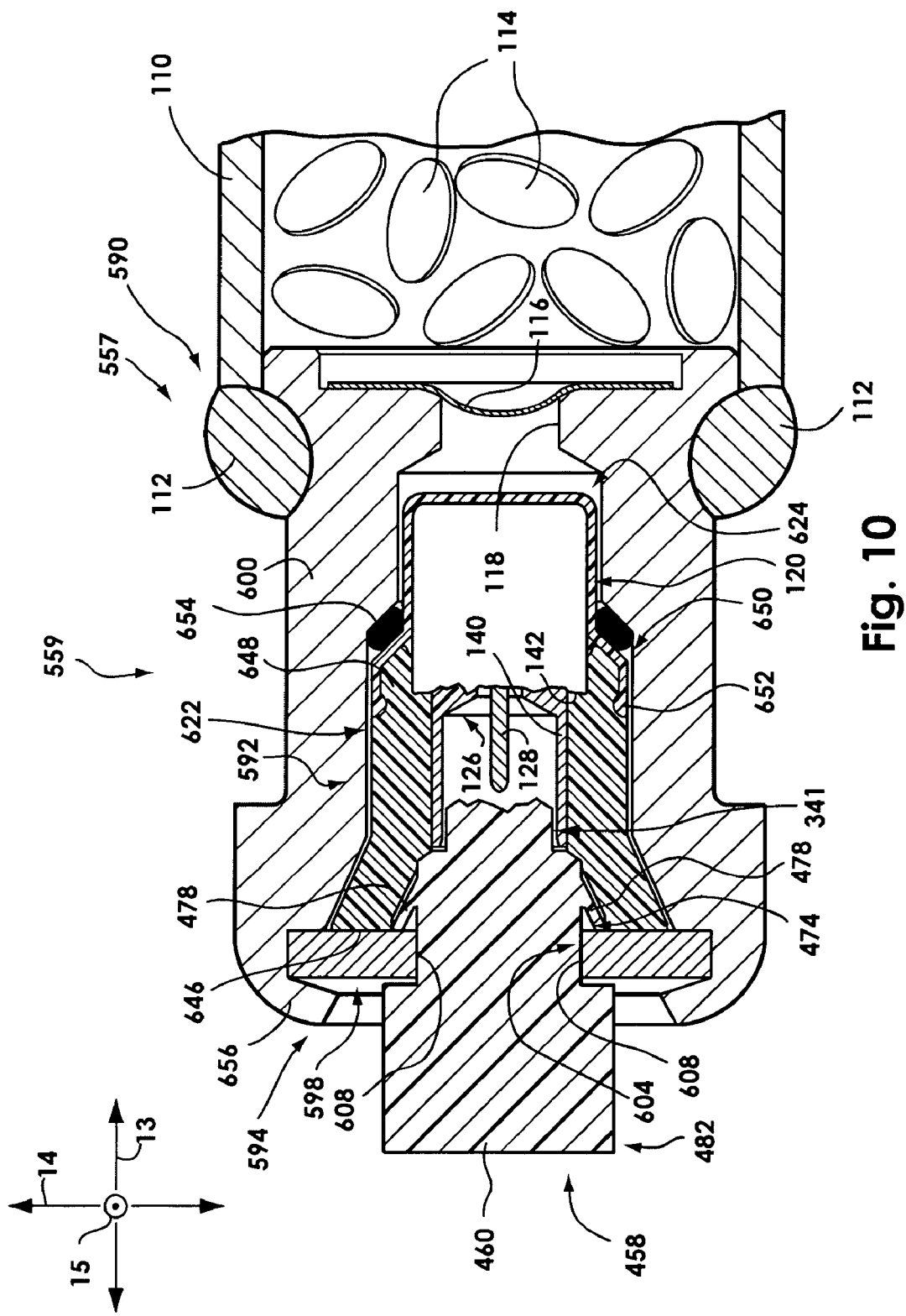
FIG. 10 is a side elevation, section view of an inflation assembly according to another alternative embodiment of the invention, with the connector connected to the inflator.

Referring to FIG. 10, a side elevation, section view illustrates the connector 458 of FIGS. 8 and 9 used in conjunction with an inflator 557 to form an inflation assembly 559 according to another alternative embodiment of the invention. As shown, the inflator 557 has a housing 590 that contains an initiation assembly 592. The initiation assembly 592 includes a receptacle 594 designed to receive the connector 458.

In place of a collar, the receptacle 594 has a washer 598 that seats directly within an initiation end 600 of the inflator 557. The washer 598 has an inside diameter 604 about which splines 608 are arrayed. Although the profile of the splines 608 is not visible in FIG. 10, they may be shaped similar to the splines 508 formed in the collar 496 of the previous embodiment.

The inflator 557 also includes a containment end 110 attached to the initiation end 600 via welds 112. As in previous embodiments, the containment end 110 contains a quantity of generant 114 separated from the initiation assembly 592 via a burst disc 116. An initiation passageway 118 is formed in the initiation end 600.

The receptacle 594 includes a body 622 and a cover 624 attached to the body 622 to generally encase an initiator 120 like those of the previous embodiments. The body 622 has an outward shoulder 646 that abuts the washer 598. The body 622 also has a lip 648 adjoining the cover 624. The cover 624 has a rim 650 that includes a lip 652 designed to engage the lip 648 of the body 622.

More precisely, the cover 624 may be snap-fitted, or snapped into engagement with the body 622 by enlarging the rim 650, inserting the body such that the lip 652 of the rim 650 slides around the lip 648 of the body 622. Enlarging the rim 650 may simply be performed by pressing the lip 652 against the generally conical shape of the inward lip 648 of the body. Once the lip 652 has moved past the lip 648, the rim 650 can at least partially relax, or "snap" back to a less deflected position in which the lips 648, 652 interfere with each other to prevent removal of the cover 624 from the body 622.

As shown, the initiator 120 is seated in the body 622. The body 622 and the initiator 120 may be relatively sized to provide a press fit that keeps gas generated by the inflator 557 from escaping between the header eyelet and the body when the inflator 557 is fired. An o-ring 654 is pressed between the rim 650 of the cover 624 and the initiation end 600 of the housing 590. The o-ring 654 is designed to prevent gas from the inflator 557 from escaping between the initiation end 600 and the cover 624 when the inflator 557 deploys. Generally, an o-ring may be used in any configuration in which the initiation assembly alone does not provide a sufficient seal.

The initiation end 600 of the housing 590 has a crimped lip 656 that retains the washer 598, and thence, the entire initiation assembly 592. The crimped lip 656 keeps the o-ring 654 in a compressed state to provide a seal. Furthermore, the crimped lip 656 may maintain pressure holding the body 622 and the cover 624 together.

The connector 458 may be installed in the receptacle 594 in a manner similar to that of the previous embodiment. The shank 341 is inserted into the skirt 140 of the header eyelet 126. The deflectable tabs 478 deflect as they slide past the splines 608 of the washer 598. The ribs 480 mesh with the splines 608 to permit the connector 458 to permit continued insertion until the deflectable tabs 478 snap back to the state illustrated in FIG. 10. The deflectable tabs 478 are then able to abut the washer 598 to prevent withdrawal of the connector 458 from the receptacle 594.

The inflator 557 may be manufactured in a number of ways. The initiation assembly 592 may be assembled by first inserting the skirt 140 of the header eyelet 126 into the body 622 such that the shoulder 142 of the header eyelet 126 abuts the body 622. The cover 624 is then snap fitted onto the body 622 by pressing the lip 652 of the cover 624 against the lip 648 of the body, as described previously.

The o-ring 654 may be disposed around the cover 624 and inserted into the initiation end 600 together with the body 622, cover 624, and initiator 120. The washer 598 is then installed in the initiation end 600 in such a manner that the outward shoulder 646 of the body 622 abuts the washer 598. The initiation end 600 is crimped to form the crimped lip 656, thereby retaining the initiation assembly 592 within the initiation end 600.

Figure 11:
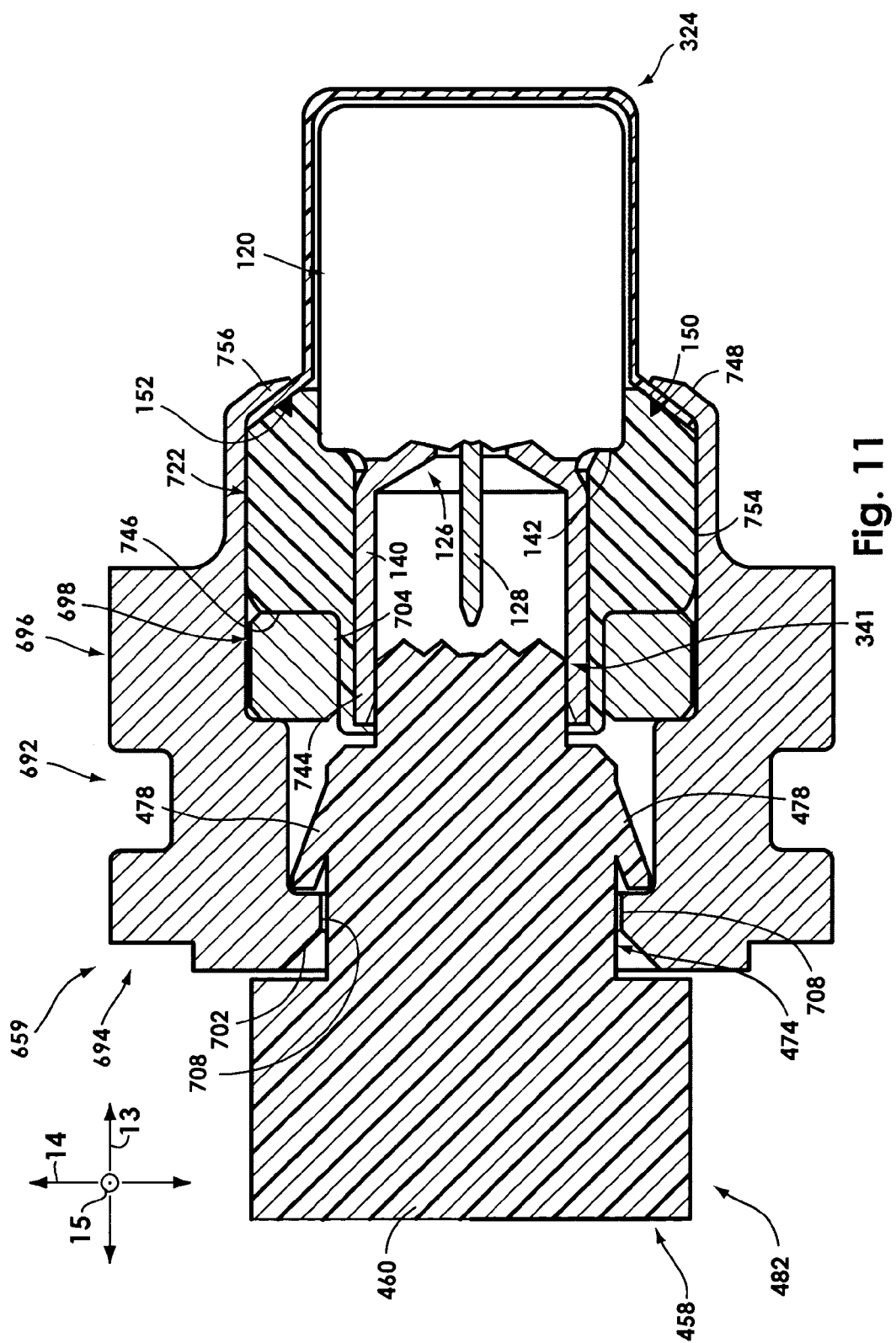
FIG. 11 is a side elevation, section view of an inflation assembly according to another alternative embodiment of the invention, with the connector connected to the inflator.

Referring to FIG. 11, a side elevation, section view illustrates a portion of an inflation assembly 659, which includes the connector 458 of the previous embodiments, together with an inflator according to an alternative embodiment of the invention. For simplicity, only the initiation assembly 692 of the inflator is shown; the remainder of the inflator may be somewhat similar to the inflators described in connection with previous embodiments.

As shown, the initiation assembly 692 includes a receptacle 694 designed to receive the connector 458. The receptacle 694 includes a collar 696 and a washer 698 contained within the collar 696. The collar 696 has an inside diameter 702. The washer 698 also has an inside diameter 704. Splines 708 are disposed about the inside diameter 702 of the collar 696. The splines 708 may be shaped similar to the splines 508 of the collar 496 of FIGS. 8 and 9.

The receptacle 694 also includes a body 722 attached to a cover 324 to generally encase an initiator 120. The body 722 has an outward shoulder 746 and an inward shoulder 748. The outward shoulder 746 abuts the washer 698 and the inward shoulder 748 is attached to the cover 324. The outward shoulder 746 may have a generally annular shape that lies flat against the washer 698. The inward shoulder 748 has a generally conical shape that abuts a rim 152 of the cover 324. The rim 152 and the inward shoulder 748 are attached together via an ultrasonic weld 150.

The body 722 also has a press fit portion 754 between the outward shoulder 746 and the inward shoulder 748. The press fit portion 754 may form a gas-tight seal in conjunction with the collar 696. The collar 696 has a crimped lip 756 that retains the washer 698, the body 622, the cover 324, and the initiator 120. The washer 698 keeps the body 722 properly positioned within the collar 696 by controlling deformation of the body 722 during assembly. Additionally, the washer 698 reinforces the body 722 against the pressure of the inflation gases generated during inflator deployment.

Connection of the connector 458 to the receptacle 694 is much the same as that described in connection with FIGS. 8 and 9. The deflectable tabs 478 deflect to slide past the splines 708. The splines 708 and the ribs 480 mesh together, possibly under slight rotation of the connector 458, and remain meshed to prevent post-assembly rotation of the connector 458. The deflectable tabs 478 are able to abut the interior of the collar 696 to prevent the connector 458 from being pulled out of the receptacle 694.

The initiation assembly 692 is relatively easily assembled. The skirt 140 of the header eyelet 126 of the initiator 120 is first inserted into the body 722. The cover 324 is positioned and ultrasonically welded to the body 722. The washer 698 is inserted into the collar 696 to abut the inside diameter 702 of the collar 696 as shown in FIG. 11. The body 722, cover 324, and initiator 120 are then inserted into the collar 696 such that the outward shoulder 746 abuts the washer 698. The collar 696 is crimped to form the crimped lip 756, which retains the washer 698, the body 722, the cover 324, and the initiator 120. The initiation assembly 692 may then be installed in an initiation end of an inflator housing (not shown).

Figure 12:
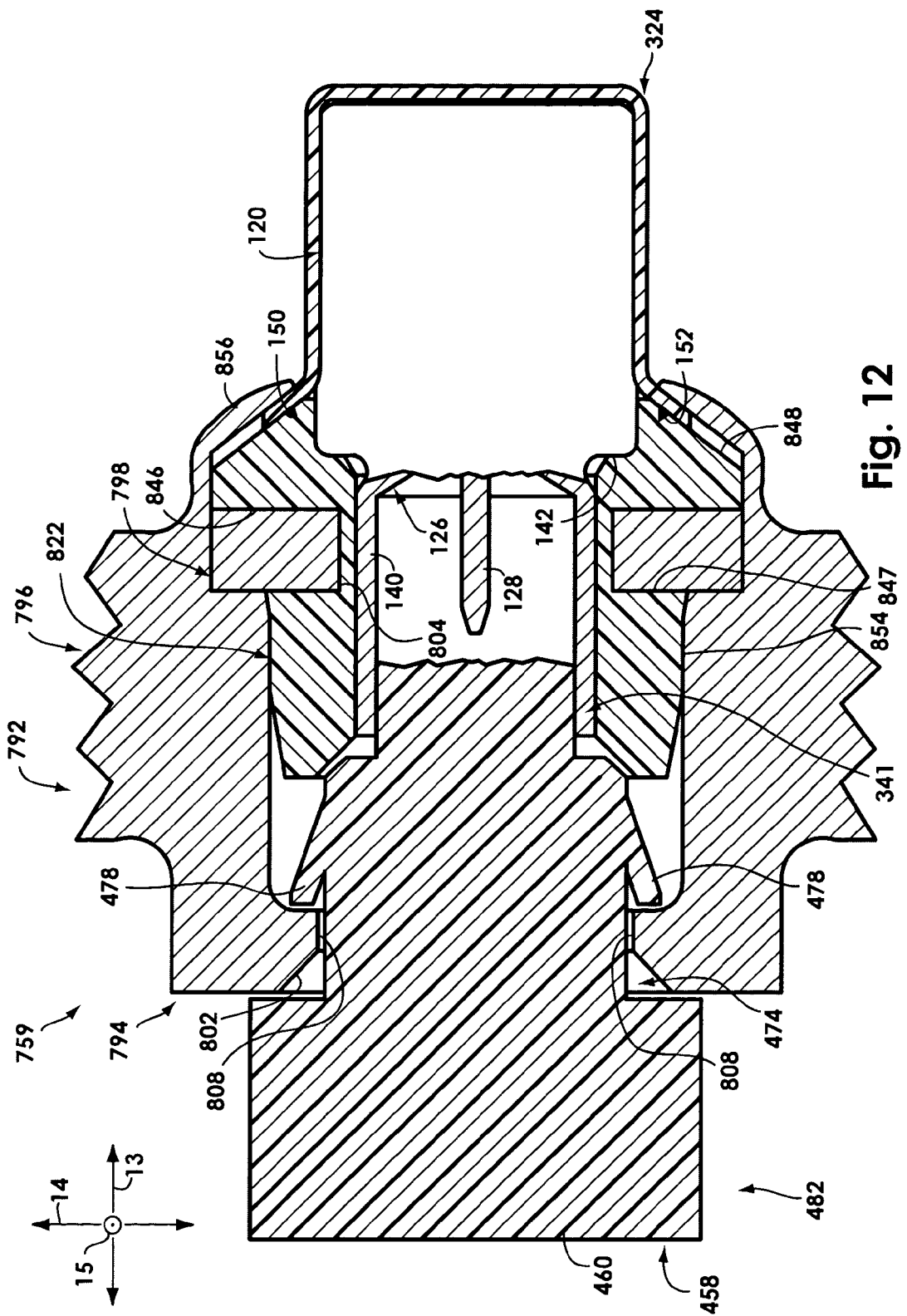
FIG. 12 is a side elevation, section view of an inflation assembly according to another alternative embodiment of the invention, with the connector connected to the inflator.

Referring to FIG. 12, a side elevation, section view illustrates a portion of another inflation assembly 759 according to the invention. The inflation assembly 759 includes the connector 458 of the immediately preceding embodiments, used in conjunction with an alternatively configured inflator. Only an initiation assembly 792 of the inflator is shown.

As illustrated, the initiation assembly 792 includes a receptacle 794 designed to receive the connector 458. The receptacle 794 includes a collar 796 and a washer 798 disposed within the collar 796. The collar 796 has an inside diameter 802. The washer 798 also has an inside diameter 804. A plurality of splines 808 are arrayed about the inside diameter 802 of the collar 796 in a manner similar to that of the previous embodiment.

The receptacle 794 includes a body 822, a cover 324, and an initiator 120 like those of previous embodiments. The cover 324 is attached to the body 822 to generally encase the initiator 120. The body 822 has an outward shoulder 846 and a retention shoulder 847 outward of the outward shoulder 846. The outward shoulder 846 and the retention shoulder 847 cooperate to retain the washer 798. More precisely, the body 822 is insert molded around the washer 798 in such a manner that the washer is sandwiched between the outward shoulder 846 and the retention shoulder 847.

The body 822 also has an inward shoulder 848 adjacent to the cover 324. The cover 324 has a lip 150 attached to the inward shoulder 848 via an ultrasonic weld 152. The body 822 may also have a press fit portion 854 outward of the washer 798. The press fit portion 854 is sized to form a press fit with the inside diameter 802 of the collar 796. The collar 796 has a crimped lip 856 that retains the cover 324, and thence, the body 822, the washer 798, and the initiator 120.

Connection of the connector 458 to the receptacle 794 is similar to that of preceding embodiments. The splines 808 mesh with the ribs 480 of the connector 458 to allow insertion of the connector 458 until the deflectable tabs 478 have snapped back to the position illustrated in FIG. 12. The splines 808 prevent nondestructive withdrawal of the connector 458 from the receptacle 794, while the splines 808 and ribs 480 continue to mesh to prevent relative post-assembly rotation.

The initiation assembly 792 may be produced relatively easily. According to one example, the body 822 is first insert molded around the washer 798. The skirt 140 of the header eyelet 126 of the initiator 120 is then inserted into the body 822 until the shoulder 142 of the header eyelet 126 abuts the body 822. The cover 324 is positioned and ultrasonically welded to the body 822. The body 822, the cover 324, the initiator 120, and the washer 798 are inserted into the collar 796 and the collar is crimped to retain the body 822, the cover 324, the initiator 120, and the washer 798. The collar 796 may then be seated in an initiation end of an inflator housing (not shown).

Figure 13:
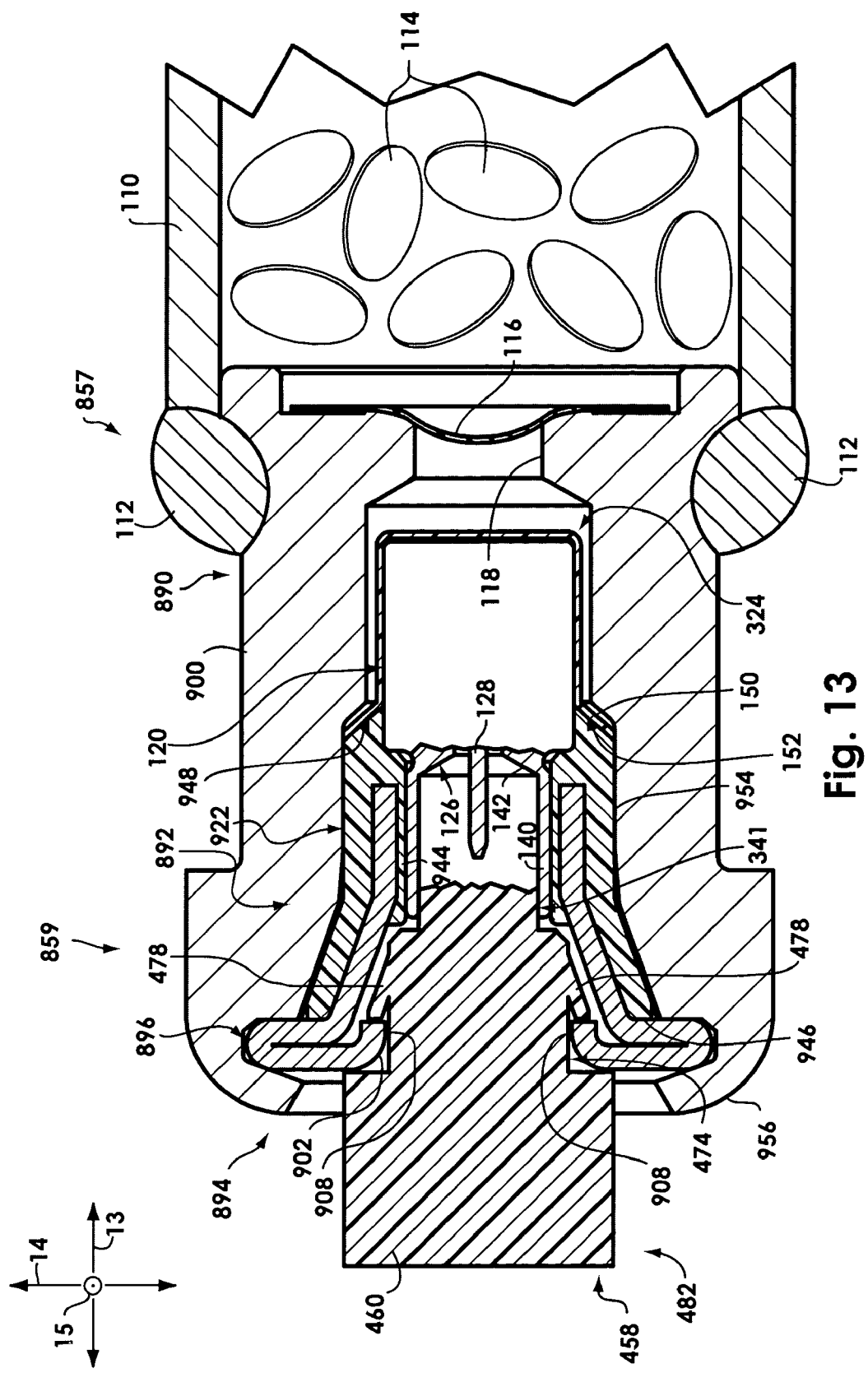
FIG. 13 is a side elevation, section view of an inflation assembly according to another alternative embodiment of the invention, with the connector connected to the inflator.

Referring to FIG. 13, a side elevation, section view illustrates an inflator 857 used in conjunction with the connector 458 described previously to provide an inflation assembly 859 according to another alternative embodiment of the invention. As shown, the inflator 857 has a housing 890 that contains an initiation assembly 892. The initiation assembly 892 has a receptacle 894 designed to receive the connector 458.

The receptacle 894 includes a collar 896, which is seated directly within an initiation end 900 of the housing 890. The collar 896 may be constructed of a metal such as steel through the use of a method such as stamping. Thus, the collar 896 may have an inside diameter 902 with an undercut shape that could not be easily formed through the use of casting operations alone. Splines 908 are arrayed about the inside diameter 902 of the collar 896. The splines 908 may have a profile generally similar to that of the splines 808 of the previous embodiment.

The receptacle 894 includes a body 922, a cover 324, and an initiator 120 generally encased by the body 922 and the cover 324. The body 922 is insert molded around the collar 896. More precisely, the body 922 has a skirt 944 disposed generally within the inside diameter 902 of the collar 896. The remainder of the body 922 is generally disposed outside the collar 896 so that the collar 896 is captured between the skirt 944 and the remainder of the body 922.

The body 922 also has an outward shoulder 946 that abuts the collar 896 and an inward shoulder 948 attached to the cover 324. The cover 324 has a rim 150 attached to the inward shoulder 948 via an ultrasonic weld 152. The body 922 also has a press fit portion 954 that is sized to provide a press fit against the interior of the initiation end 900. The initiation end 900 has a crimped lip 956 that retains the collar 896, and thence, the body 922, the cover 324, and the initiator 120.

The connector 458 is installed in the receptacle 894 in much the same manner as in the preceding embodiments. The deflectable tabs 478 deflect to slide past the splines 908 and the splines 908 mesh with the ribs 480 of the connector 458. The deflectable tabs 478 prevent withdrawal of the connector 458 from the receptacle 894 and the meshing of the splines 908 with the ribs 480 prevents relative post-assembly rotation.

Figure 14:
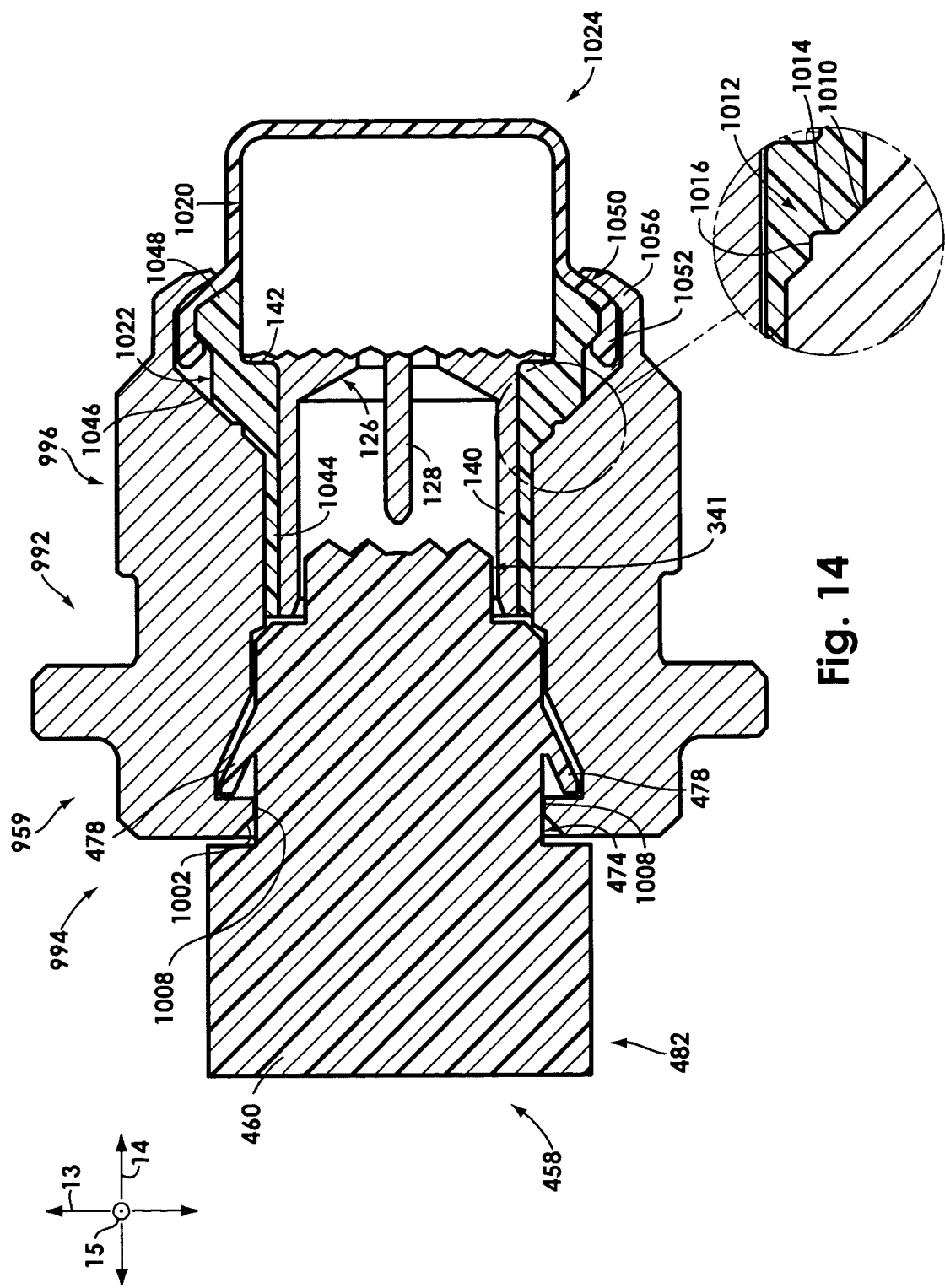
FIG. 14 is a side elevation, section view of an inflation assembly according to another alternative embodiment of the invention, with the connector connected to the inflator.

Referring to FIG. 14, a side elevation, section view illustrates a portion of an inflation assembly 959 according to another embodiment of the invention. The inflation assembly 959 includes the connector 458 of the preceding embodiments, along with an inflator, of which only an initiation assembly 992 is shown. The initiation assembly 992 has a receptacle 994 designed to receive the connector 458.

The receptacle 994 includes a collar 996, which may be retained directly by the inflator housing (not shown). The collar 996 has an inside diameter 1002 about which a plurality of splines 1008 are arrayed. The splines 1008 have a profile generally similar to the splines 508 of FIGS. 8 and 9.

The collar 996 also has a generally conical interior surface 1010 on which an annular ridge 1012 is formed. The generally conical interior surface 1010 may be disposed at an angle of approximately 45° with respect to an axis of the collar 996. In alternative embodiments, a differently angled or non-conical surface may be used. For example, a curved interior surface may be used in place of the conical interior surface 1010.

In cross section, the annular ridge 1012 has a first surface 1014 and a second surface 1016. The first and second surfaces 1014, 1016 meet at an angle of approximately 90°. Due to the angle of the generally conical interior surface 1010, the first and second surfaces 1014, 1016 point inward at an angle of approximately 45°. Alternative angles may be used, if desired. The first and second surfaces 1014, 1016 converge at substantial point or small-radius juncture, as shown.

The initiation assembly 992 also has an initiator 1020, which may have components generally similar to those of the initiator 120. The initiator 1020, however, has a comparatively compact design, perhaps with a smaller amount of ignition material (not shown) for a lower yield initiation. The initiator 1020 may, however, have a header eyelet 126 and a center pin 128 similar to those of the initiator 120.

The initiator 1020 is generally encased within a body 1022 and a cover 1024. The body 1022 and the cover 1024 are snap-fitted together around the initiator 1020 in a manner similar to that of previous embodiments. The body 1022 has a skirt 1044 that encircles at least a portion of the skirt 140 of the header eyelet 126 and is disposed inward of the collar 996. The body 1022 also has an outward shoulder 1046 that abuts the generally conical interior surface 1010 of the collar 996 and a lip 1048 that snap-fits with the cover 1024.

More precisely, since the material of the collar 996 is harder than that of the body 1022, the annular ridge 1012 of the collar 996 presses into the outward shoulder 1046, as illustrated, to form a seal to prevent gas flow through the region encircling the body 1022. The angle between the first and second surfaces 1014 and 1016 facilitates deformation of the body 1022 by the annular ridge 1012. The annular ridge 1012 eliminates a part by making an o-ring unnecessary, or may be used to supplement the sealing action provided by an o-ring. The annular ridge 1012 is also comparatively fail-safe because there is no separate sealing part that could be inadvertently omitted during assembly.

The cover 1024 has a rim 1050 with a lip 1052 designed to snap into engagement with the lip 1048 of the body 1022 in a manner similar to that set forth in connection with previous embodiments. The cover 1024 has a comparatively short longitudinal dimension to match the compact size of the initiator 1020. The collar 996 has a crimped lip 1056 that directly retains the cover 1024, thereby retaining the body 1022 and the initiator 1020.

The connector 458 is installed in the receptacle 494 in a manner similar to that of previous embodiments. The shank 341 is inserted into the skirt 140 of the header eyelet 126 of the initiator 1020, and the deflectable tabs 478 deflect to slide past the splines 1008 of the collar 996. The splines 1008 mesh with the ribs 480 of the connector 458 after minor rotational alignment. The deflectable tabs 478 slide clear of the splines 1008 and return to less deflected positions, as shown, to prevent the connector 458 from being pulled out of the receptacle 994. The splines 1008 mesh with the ribs 480 to prevent relative post-assembly rotation.

The initiation assembly 992 may be assembled in a wide variety of ways. The body 1022 may first be pressed into the collar 996 such that the outward shoulder 1046 presses against and is deformed by the annular ridge 1012. The initiator 1020 is then inserted such that the skirt 140 of the header eyelet 126 passes into the skirt 1044 of the body 1022. The cover 1024 is then positioned on the initiator 1020 and pressed into engagement with the body 1022. The collar 996 is crimped to retain the cover 1024, the body 1022, and the initiator 1020. As with some previous embodiments, the body 1022 and the cover 1024 may alternatively be attached together around the initiator 1020 prior to insertion of the body 1020 into the collar 996.

Figure 15:
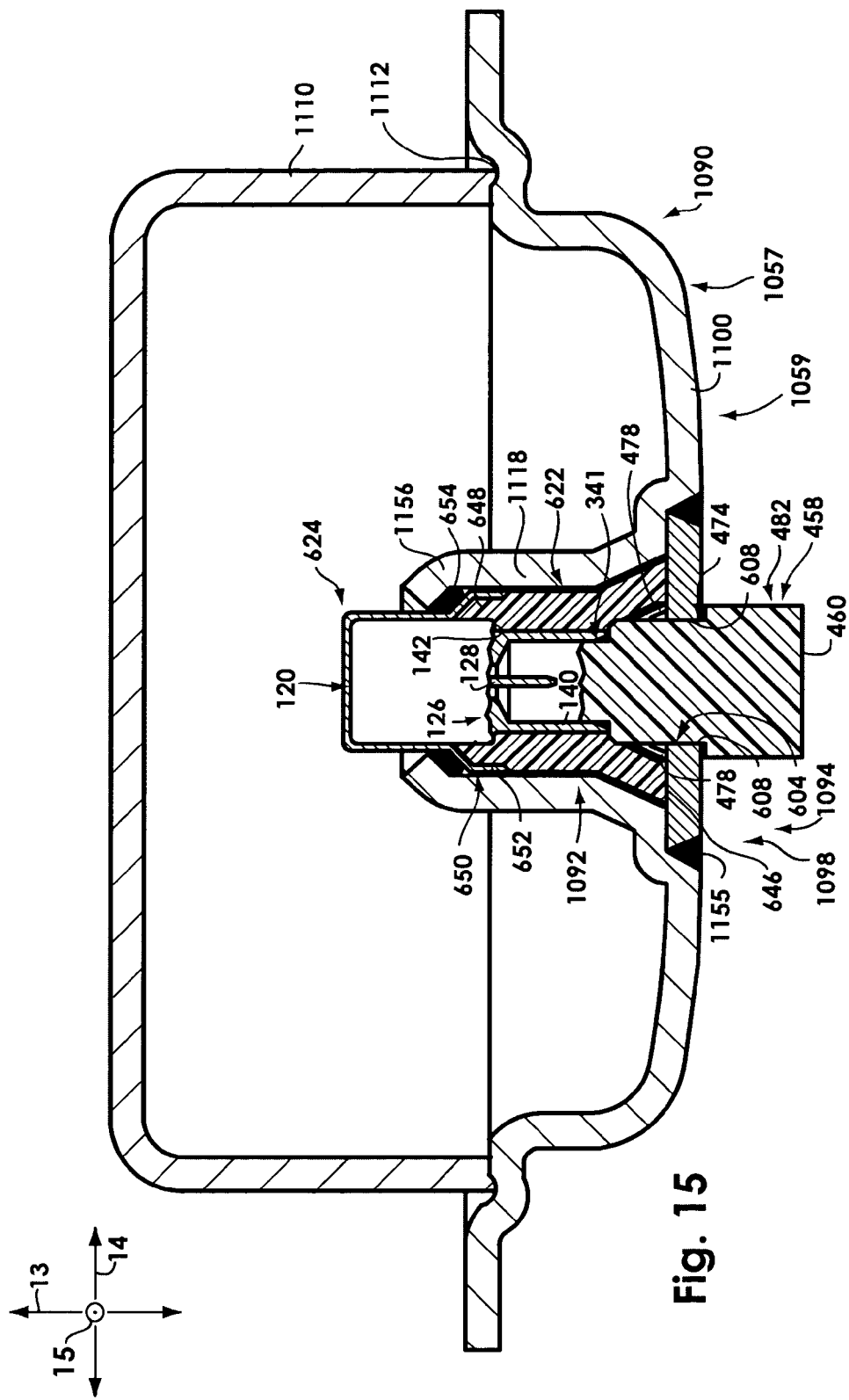
FIG. 15 is a side elevation, section view of an inflation assembly according to another alternative embodiment of the invention, with the connector connected to the inflator.

Referring to FIG. 15, a side elevation, section view illustrates an alternatively configured inflator 1057 that may be used in conjunction with the collar 458 to provide an inflation assembly 1059 according to another alternative embodiment of the invention. As shown, the inflator 1057 is of a type suitable for a driver's side front impact airbag or the like. The various inflation assemblies of the present invention are thus not limited in application to any specific inflator or airbag type.

As shown, the inflator 1057 has a housing 1090 that generally contains an initiation assembly 1092. The initiation assembly 1092 is similar to the initiation assembly 592 of the inflation assembly 559 of FIG. 10. The initiation assembly 1092 includes a receptacle 1094 designed to receive the connector 458. The receptacle 1094 includes a washer 1098 that retains the connector 458 in a manner similar to that of the washer 598 of the inflation assembly 559 FIG. 10. The washer 1098 has an inside diameter 604 on which splines 608 like those of the washer 598 are arrayed.

The housing 1090 has an initiation end 1100 in which the initiation assembly 1092 is generally disposed. Additionally, the housing 1090 has a containment end 1110 that contains a quantity of generant material (not shown) similar to the generant 114 of FIG. 1. The containment end 1110 meets the initiation end 1100 at a junction 1112, which may comprise a weld, mechanical fastener array, or other mechanism that attaches the containment end 1110 to the initiation end 1100. A socket 1118 is formed in the initiation end 1100 to receive and retain the initiation assembly 1092. The generant may be in direct contact with the socket 1118, or may be separated from the socket 1118 by a burst disc or the like.

In addition to the washer 1098, the initiation assembly 1092 includes an initiator 120, a body 622, a cover 624, and an o-ring 654, which may be the same as their counterparts from FIG. 10. As shown, the cover 624 is snap-fitted to the body 622. The body 622 has an outward shoulder 646 and a lip 648. The cover 624 has a rim 650 with a lip 652 that can expand to snap into engagement with the lip 648 of the body 622. The o-ring 654 prevents gas from entering or exiting the interior of the inflator 1057 through the region encircling the body 622, or the region between the body 622 and the socket 118.

As illustrated, the washer 1098 is not retained by any type of crimped lip, but is rather secured flush with the outer wall of the initiation portion 1100 of the housing 1090 by a weld 1155. The weld 1155 may be a conventional thermal weld extending around the circumference of the washer 1098, a projection weld, or a laser weld. The socket 1118 may have a lip 1156 that retains the o-ring 654, and thence, the remainder of the initiation assembly 1092. The lip 1156 may be crimped or may be formed by the same operations used to form the remainder of the socket 1118.

The connector 458 is installed in the receptacle 1094 in a manner similar to that of the receptacle 594 of FIG. 10. The shank 341 is inserted into the skirt 140 of the header eyelet 126 of the initiator 120 and the deflectable tabs 478 deflect to slide past the splines 608. The splines 608 are easily aligned with the ribs 480 of the connector 480 and mesh with the ribs 480 to permit the deflectable tabs 478 to move clear of the splines 608. The deflectable tabs 478 then return to a less deflected state to block removal of the connector 458 from the receptacle 1094. The meshing of the splines 608 with the ribs 480 prevents relative post-assembly rotation.

The inflator 1057 may be manufactured by, first, forming the housing 1090 via stamping, stamping, or the like. According to one example, the socket 1118 is stamped into the initiation end 1100 via a die having a corresponding shape. The lip 1156 may be simply be formed as part of the stamping process, or may be separately crimped into shape, if desired. After the initiation end 1100 and the containment end 1110 are formed, the generant may then be inserted into one of the ends 1100, 1110 and the ends 1100, 1110 may be attached together at the junction 1112 via inertial welding, fastening, or the like.

The body 622 and the cover 624 may be snapped together around the initiator 120. The o-ring 654 is then inserted into the socket 1118 or disposed around the cover 624, and the cover 624, body 622, and initiator 120 are inserted into the socket 1118 such that the o-ring 654 is compressed between the lip 1156 and the cover 624 as shown. Then, the washer 1098 is positioned and attached to the initiation end 1100 via the weld 1155.

Figure 16:
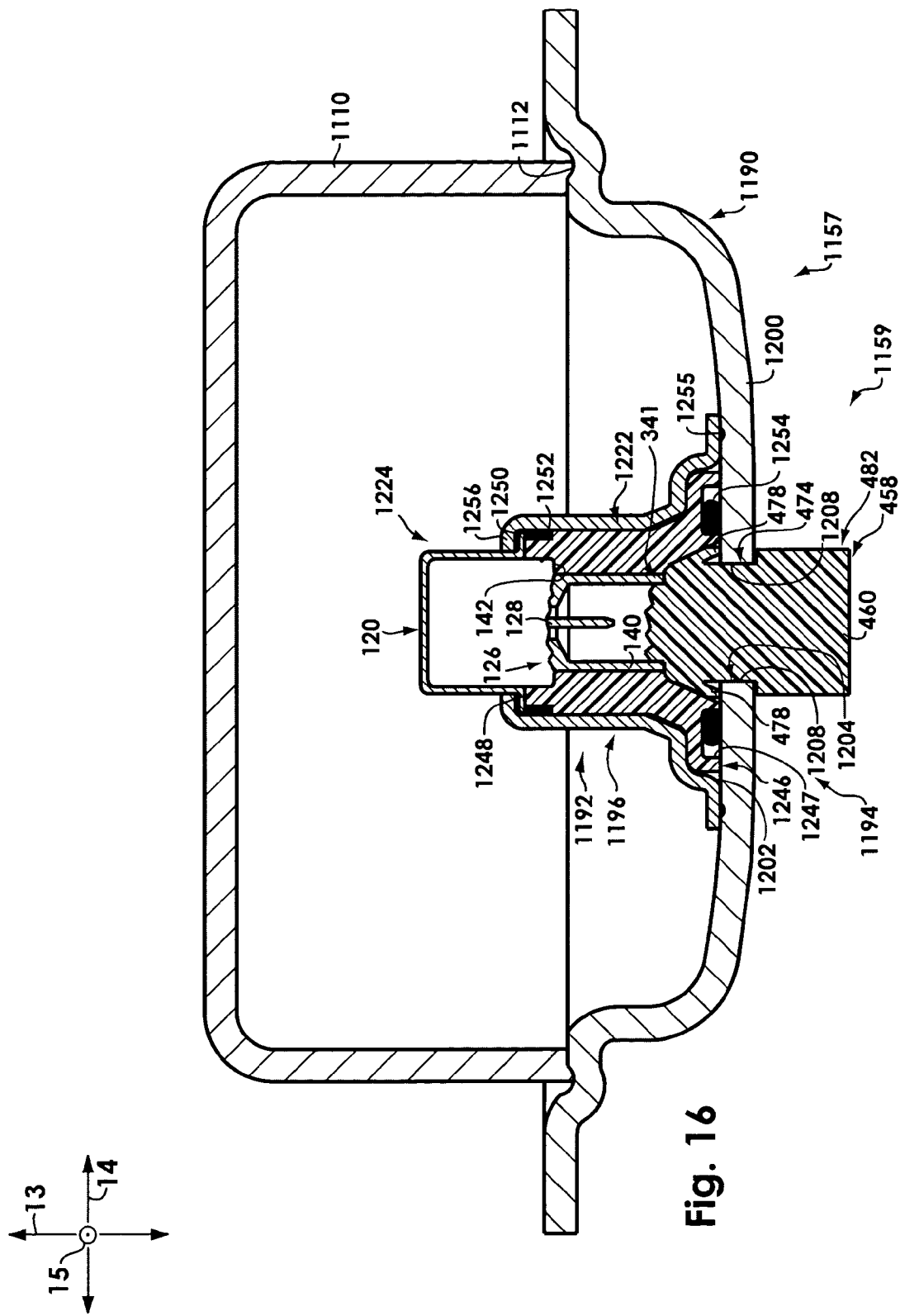
FIG. 16 is a side elevation, section view of an inflation assembly according to another alternative embodiment of the invention, with the connector connected to the inflator.

Referring to FIG. 16, a differently configured inflator 1157 may be used in conjunction with the connector 458 to provide an inflation assembly 1159 according to another alternative embodiment of the invention. The inflator 1157 is also of a type that may be used for a driver's side, front impact airbag or the like. The inflator 1157 has a housing 1190 somewhat similar to the housing 1090 of the previous embodiment. The housing 1190 contains an initiation assembly 1192. The initiation assembly 1192 includes a receptacle 1194 designed to receive the connector 458.

The receptacle 1194 has a collar 1196, which may be secured directly to an initiation end 1200 of the housing 1190. The collar 1196 has an inside diameter 1202, and the initiation end 1200 of the housing 1190 also has an inside diameter 1204. A plurality of splines 1208 are arrayed about the inside diameter 1204 of the initiation end 1200.

The receptacle 1194 further includes an initiator 120, a body 1222, and a cover 1224 that attaches to the body 1222 to generally encase the initiator 120. The body 1222 has an outward shoulder 1246 that abuts the initiation end 1200 of the housing 1190. An annular recess 1247 is formed in the outward shoulder 1246. The body 1222 also has an inward shoulder 1248 adjacent to the cover 1224. The cover 1224 has a rim 1250 attached to the inward shoulder 1248 via an ultrasonic weld 1252. Unlike previous embodiments, the inward shoulder 1248 has a substantially tubular shape. The rim 1250 is shaped in a corresponding manner to receive the inward shoulder 1248. The ultrasonic weld 1252 is disposed on the outside diameter of the inward shoulder 1248.

An o-ring 1254 is positioned in the annular recess 1247 of the outward shoulder 1246. The collar 1196 is attached to the initiation end 1200 of the housing 1190 via a weld 1255 formed about the periphery of the collar 1196. The weld 1255 may not provide a hermetic seal between the initiation assembly 1192 and the remainder of the interior of the inflator 1157. Thus, positioning of the o-ring 1254 in the annular recess 1247 keeps gases from moving into or out of the interior of the inflator 1157 through the gap between the connector 458 and the inside diameter 1204 of the initiation end 1200. The collar 1196 has a lip 1256 that retains the cover 1224, and thence, the body 1222 and the initiator 120.

The connector 458 may be installed in the receptacle 1194 in a manner similar to that of the previous embodiments. More precisely, the shank 341 is inserted into the skirt 140 of the header eyelet 126 of the initiator 120 while the deflectable tabs 478 deflect to slide past the splines 1208 of the initiation end 1200. The splines 1208 mesh with the ribs 480 of the connector 458 to permit the deflectable tabs 478 to slide clear of the splines 1208 and return to a less deflected state. The deflectable tabs 478 prevent the connector 458 from being pulled from the receptacle 1194 while the meshing of the splines 1208 with the ribs 480 prevents relative post-assembly rotation of the connector 458 and the inflator 1157.

The inflator 1157 may be assembled in a variety of ways. According to one method, the initiation end 1200 and the containment end 1110 are formed by casting, stamping, or the like. If desired, the overall shape of the initiation end 1200 may be formed by one process, and the splines 1208 may be formed in the initiation end 1200 through the use of a separate operation. The collar 1196 may also be formed by stamping or the like. The lip 1256 may be formed as part of the stamping operation or in a separate crimping operation.

The initiator 120 may be inserted into the body 1222 and the cover 1224 may be positioned and ultrasonically welded to the body 1222 as described above. The o-ring 1254 is inserted into the annular recess 1247. The initiator 120, the body 1222, the cover 1224, and the o-ring 1254 are inserted into the collar 1196 until the rim 1250 of the cover 1224 abuts the lip 1256 of the collar 1196. The collar 1196, the body 1222, the cover 1224, the initiator 120, and the o-ring 1254 are then positioned with respect to the initiation end 1200 and the collar 1196 is attached to the interior surface of the initiation end 1200 via the weld 1255. The two ends 1200, 1110 of the housing 1190 are attached together at the juncture 1112 to enclose the generant (not shown).

Referring to FIG. 17, a differently configured inflator 1257 may be used in conjunction with the connector 26 of FIGS. 1–3 to provide an inflation assembly 1259 according to another alternative embodiment of the invention. The connector 26 has a main body 82 in which a head 70 is formed, with a skirt 74 extending from the head 70. A shank 141 extends from the head 70 and from within the skirt 74. The skirt 74 has a distal ring 76 from which a pair of projections, or deflectable tabs 78, extend inward toward the shank 141.

As in the previous two embodiments, the inflator 1257 is also of a type that may be used for a driver's side, front impact airbag or the like. The inflator 1257 has a housing 1290 somewhat similar to the housing 1190 of the previous embodiment. The housing 1290 contains an initiation assembly 1292. The initiation assembly 1292 includes a receptacle 1294 designed to receive the connector 26.

The housing 1290 has an initiation end 1300 in which the initiation assembly 1292 is generally disposed. Additionally, the housing 1290 has a containment end 1110 like that of FIG. 15. The containment end 1110 meets the initiation end 1300 at a junction 1112. A socket 1318 is formed in the initiation end 1300 to receive and retain the initiation assembly 1292.

The receptacle 1294 has a retainer 98 similar to that of the embodiment of FIGS. 1–3. The retainer 98 has an inside diameter 104 and an outside diameter 106. The retainer 98 has a plurality of splines 108 arrayed about the outside diameter 106. The splines 108 are spaced in a manner that corresponds to the spacing of the ribs 80 to enable rotational locking, as described previously.

The receptacle 1294 further includes an initiator 120, a body 322, and a cover 324 that attaches to the body 322 to generally encase the initiator 120. As in previous embodiments, the initiator 120 has a header eyelet 126, a center pin 128, a skirt 140, and shoulder 142. The body 322 and the cover 324 may be similar to those illustrated in FIG. 6. Hence, the body 322 has an outward shoulder 346 that abuts the initiation end 1300 of the housing 1290. The body 322 also has an inward shoulder 348 adjacent to the cover 324. The cover 324 has a rim 150 attached to the inward shoulder 348 via an ultrasonic weld 152. The body 322 has a skirt 144 to which the retainer 98 is attached via an ultrasonic weld 155. The skirt 144 is retained by a press fit portion 1345 of the socket 1318.

The connector 26 may be installed in the receptacle 1294 in a manner similar to that of the embodiment of FIGS. 1–3. More precisely, the shank 141 is inserted into the skirt 140 of the header eyelet 126 of the initiator 120 while the deflectable tabs 78 deflect to slide past the splines 108 of the retainer 98. The splines 108 mesh with the ribs 80 of the connector 26 to permit the deflectable tabs 78 to slide clear of the splines 108 and return to a less deflected state. The deflectable tabs 78 prevent the connector 26 from being pulled from the receptacle 1294 while the meshing of the splines 108 with the ribs 80 prevents relative post-assembly rotation of the connector 26 and the inflator 1257.

The inflator 1257 may be assembled in a variety of ways. According to one method, the initiation end 1300 and the containment end 1110 are formed by casting, stamping, or the like. The initiator 120 may be inserted into the body 322 and the cover 324 may be positioned and ultrasonically welded to the body 322 as described above. The initiator 120, the body 322, and the cover 324 are urged into position with respect to the press fit portion 1345 of the socket 1318. The body 322, the cover 324, and the initiator 120 are then positioned with respect to the initiation end 1300 and the retainer 98 is attached to the skirt 144 of the body 322 via the ultrasonic weld 155. The two ends 1300, 1110 of the housing 1290 are attached together at the juncture 1112 to enclose the generant (not shown).

Referring to FIG. 18, a differently configured inflator 1357 may be used in conjunction with the connector 26 of FIGS. 1–3 to provide an inflation assembly 1359 according to another alternative embodiment of the invention. Again, the connector 26 has a main body 82 in which a head 70 is formed, with a skirt 74 extending from the head 70. A shank 141 extends from the head 70 and from within the skirt 74. The skirt 74 has a distal ring 76 from which a pair of projections, or deflectable tabs 78, extend inward toward the shank 141.

As in the previous three embodiments, the inflator 1357 is also of a type that may be used for a driver's side, front impact airbag or the like. The inflator 1357 has a housing 1390 somewhat similar to the housing 1290 of the previous embodiment. The housing 1390 contains an initiation assembly 1392. The initiation assembly 1392 includes a receptacle 1394 designed to receive the connector 26.

The housing 1390 has an initiation end 1400 in which the initiation assembly 1392 is generally disposed. Additionally, the housing 1390 has a containment end 1110 like that of FIG. 15. The containment end 1110 meets the initiation end 1400 at a junction 1112. A socket 1418 is formed in the initiation end 1400 to receive and retain the initiation assembly 1392. The socket 1418 may be similar in shape, but slightly larger, than the socket 1318 of the previous embodiment.

The receptacle 1394 has a retainer 98 similar to that of the embodiment of FIGS. 1–3. Again, the retainer 98 has an inside diameter 104 and an outside diameter 106. The retainer 98 has a plurality of splines 108 arrayed about the outside diameter 106. The splines 108 are spaced in a manner that corresponds to the spacing of the ribs 80 to enable rotational locking, as described previously.

The receptacle 1394 further includes an initiator 120, a body 1422, and a cover 124 that attaches to the body 1422 to generally encase the initiator 120. As in previous embodiments, the initiator 120 has a header eyelet 126, a center pin 128, a skirt 140, and shoulder 142. The body 1422 has a skirt 1444 to which the retainer 98 is attached. The skirt 1444 is retained by a press fit portion 1445 of the socket 1318. The body 1422 has an outward shoulder 1446 that abuts the socket 1418 of the housing 1390. An annular recess 1447 is formed in the outward shoulder 1446. The body 1422 also has an inward shoulder 1448 adjacent to the cover 124. The cover 124 may be similar to that illustrated in FIG. 3. Hence, the cover 124 has a rim 150 attached to the inward shoulder 1448 via an ultrasonic weld 152.

An o-ring 1454 is positioned in the annular recess 1447 of the outward shoulder 1446. The press fit of the skirt 1444 within the press fit portion 1445 of the socket 1418 may not provide a hermetic seal between the initiation assembly 1392 and the socket 1418. Thus, positioning of the o-ring 1454 in the annular recess 1447 keeps gases from moving into or out of the interior of the inflator 1357 between the skirt 1444 and the press fit portion 1445.

The connector 26 may be installed in the receptacle 1394 in a manner similar to that of the embodiment of FIGS. 1–3. More precisely, the shank 141 is inserted into the skirt 140 of the header eyelet 126 of the initiator 120 while the deflectable tabs 78 deflect to slide past the splines 108 of the retainer 98. The splines 108 mesh with the ribs 80 of the connector 26 to permit the deflectable tabs 78 to slide clear of the splines 108 and return to a less deflected state. The deflectable tabs 78 prevent the connector 26 from being pulled from the receptacle 1394 while the meshing of the splines 108 with the ribs 80 prevents relative post-assembly rotation of the connector 26 and the inflator 1357.

The inflator 1357 may be assembled in a variety of ways. According to one method, the initiation end 1400 and the containment end 1110 are formed by casting, stamping, or the like. The initiator 120 may be inserted into the body 1422 and the cover 124 may be positioned and ultrasonically welded to the body 1422 as described above. The o-ring 1454 is disposed in the annular recess 1447 of the outward shoulder 1446 of the body 1422. The initiator 120, the body 1422, the cover 124, and the o-ring 1454 are urged into position with respect to the press fit portion 1445 of the socket 1418. The body 1422, the cover 124, and the initiator 120 are then positioned with respect to the initiation end 1300 and the retainer 98 is attached to the skirt 1444 of the body 1422 via an ultrasonic weld 1455. The two ends 1400, 1110 of the housing 1390 are attached together at the juncture 1112 to enclose the generant (not shown).

"Adaptive inflators" are inflators that produce variable volumes of gas in response to the severity of a collision. Some adaptive inflators have multiple initiators that must be individually activatable. Hence, separate connectors are used and must be connected properly to the initiators to ensure correct deployment. Consequently, it can be desirable to "key code" the two receptacles of the inflator to ensure that only the proper connector can be connected to each receptacle.

According to one example, key coding may be accomplished by using receptacles and connectors with different numbers of splines and ribs. Thus, each receptacle has a number of splines and will only receive a connector with the same number of splines. However, other structures besides splines and ribs may be used to prevent post-assembly rotation and/or key-coding. Some such examples will be shown and described in connection with FIGS. 19A through 19E.

Referring to FIG. 19A, a front elevation, section view illustrates an inflation assembly 1460 according to another alternative embodiment of the invention. The inflation assembly 1460 includes an inflator 1462 with a receptacle 1464 and a connector 1466 designed to be received by the receptacle 1464. The section is taken through the connector 1466, but not through the inflator 1462. The connector 1466 has a locking extension 1468 that extends into and interlocks with the receptacle 1464 in a manner similar to the locking extension 474 of FIGS. 8 and 9.

As shown, the locking extension 1468 has a generally circular cross sectional shape. The circular shape matches the general shape of the receptacle 1464. Hence, a non-circular locking extension of similar size will not fit into the receptacle 1464. If desired, splines, ribs, and/or other features may be used to prevent post-assembly rotation.

Referring to FIG. 19B, a front elevation, section view illustrates an inflation assembly 1470 according to another alternative embodiment of the invention. The inflation assembly 1470 has an inflator 1472 with a receptacle 1474 designed to receive a connector 1476. The connector 1476 has a locking extension 1478 with a generally triangular shape that corresponds to the shape of the receptacle 1474. The triangular shape provides key coding and prevents post-assembly rotation of the connector 1476 with respect to the inflator 1472.

Thus, for example, the connector 1476 of FIG. 19B could not be inserted into the receptacle 1464 of FIG. 19A, and the connector 1466 of FIG. 19A could not be inserted into the receptacle 1474 of FIG. 19B. The receptacles 1464 and 1474 could thus be disposed on a single, adaptive inflator and each would exclusively receive the proper connector. Furthermore, use of the wrong inflator in a given installation is prevented.

Referring to FIG. 19C, a front elevation, section view illustrates an inflation assembly 1480 according to another alternative embodiment of the invention. The inflation assembly 1480 includes an inflator 1482 with a receptacle 1484 designed to receive a connector 1486. The connector 1486 has a locking extension 1488 with a generally square shape that corresponds to the shape of the receptacle 1484 to provide key coding and prevent relative post-assembly rotation. Other non-square, parallelogrammic shapes may alternatively be used.

Referring to FIG. 19D, a front elevation, section view illustrates an inflation assembly 1490 according to another alternative embodiment of the invention. The inflation assembly 1490 includes an inflator 1492 with a receptacle 1494 designed to receive a connector 1496. The connector 1496 has a locking extension 1498 with a generally pentagonal shape that corresponds to the shape of the receptacle 1494 to provide key coding and prevent relative post-assembly rotation. Other five-sided shapes may alternatively be used.

Referring to FIG. 19E, a front elevation, section view illustrates an inflation assembly 1500 according to another alternative embodiment of the invention. The inflation assembly 1500 includes an inflator 1502 with a receptacle 1504 designed to receive a connector 1506. The connector 1506 has a locking extension 1508 with a generally hexagonal shape that corresponds to the shape of the receptacle 1508 to provide key coding and prevent relative post-assembly rotation. Other six-sided shapes may alternatively be used. Furthermore, shapes with any number of sides, alternative rounded shapes, or shapes having a mixture of rounded and straight sides, may also be used to facilitate fail-safe installation and operation of an inflator.

The initiation assemblies provided by the present invention are not limited in application to airbags. Rather, the systems and methods of the invention may be used in conjunction with a variety of pyrotechnic devices such as explosives, flares, visual effects, and the like. The various embodiments illustrated above may readily be adapted to such applications through the use of knowledge available in the art.

Through the use of the present invention, inflators may be more simply and inexpensively manufactured due to a reduction in the number of parts and/or labor intensive manufacturing steps. Furthermore, the electrical connections of an airbag module according to the invention may be easily and rapidly assembled without adversely impacting the reliability and integrity of the airbag system.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. An initiation assembly for a pyrotechnic device, the initiation assembly comprising:
    an initiator that ignites in response to receipt of an activation signal; and
    a retainer coupled to the initiator, the retainer comprising at least three splines shaped to mate with at least one rib of a connector such that the connector is engageable with the retainer in at least three orientations to enable conveyance of the activation signal from the connector to the initiator, wherein the splines and the rib mesh to prevent rotation of the connector between the orientations.

2. The initiation assembly of claim 1, wherein the splines are disposed on an outside diameter of the retainer.

3. The initiation assembly of claim 1, wherein the splines are disposed on an inside diameter of the retainer.

4. The initiation assembly of claim 1, further comprising a body attached to the retainer such that the body encircles at least a portion of the initiator.

5. The initiation assembly of claim 4, wherein the retainer and the body are each constructed of polymeric materials, wherein the retainer is ultrasonically welded to the body.

6. The initiation assembly of claim 4, wherein the initiator comprises a center pin, a header eyelet encircling at least a portion of the center pin, a cup welded to the header eyelet to provide a hermetic seal, a bridge wire that electrically couples the center pin and the header eyelet together, and a quantity of ignition material positioned to ignite in response to combustion of the bridge wire.

7. The initiation assembly of claim 6, further comprising a cover attached to the body to electrically insulate the initiator from an inflator housing.

8. The initiation assembly of claim 1, further comprising a collar disposed to encircle at least a portion of the retainer, wherein the collar is shaped to be retained within a housing of the inflator.

9. The initiation assembly of claim 1, wherein the retainer is shaped to interchangeably interlock with a nonremovable connector and with a removable connector comprising a main body and a locking bracket movable with respect to the main body between an unlocked position in which the connector is removable from the retainer and a locked position in which the connector is not removable from the retainer.

10. An initiation assembly for a pyrotechnic device, the initiation assembly comprising:
    an initiator that ignites in response to receipt of an activation signal;
    a body that encircles at least a portion of the initiator; and
    a retainer integrally formed with the body, the retainer comprising at least three splines shaped to mate with at least one rib of a connector such that the connector is engageable with the retainer in at least three orientations to enable conveyance of the activation signal from the connector to the initiator, wherein the splines and the rib mesh to prevent rotation of the connector between the orientations.

11. The initiation assembly of claim 10, further comprising a collar disposed to encircle at least a portion of the retainer and the body, wherein the collar is shaped to be retained within a housing of the inflator.

12. The initiation assembly of claim 11, wherein the collar comprises a first piece and a second piece attached to the first piece, wherein the body is insert molded into engagement with the first piece.

13. An inflation assembly for an airbag module for protecting an occupant of a vehicle from impact, the inflation assembly comprising:
    a connector that delivers an electric activation signal; and
    an inflator comprising a receptacle shaped to receive the connector in any of at least three orientations in a manner that prevents rotation of the connector between the orientations to enable conveyance of the activation signal from the connector to the inflator, wherein the inflator produces inflation gas in response to receipt of the activation signal.

14. The inflation assembly of claim 13, wherein the receptacle comprises at least three splines disposed to mate with at least one rib of the connector.

15. The inflation assembly of claim 14, wherein the inflator comprises an initiator that ignites in response to receipt of the activation signal, wherein the receptacle comprises a retainer attached to the initiator to retain the connector, the retainer having a generally annular shape, wherein the splines are formed on an outside diameter of the retainer.

16. The inflation assembly of claim 14, wherein the inflator comprises an initiator that ignites in response to receipt of the activation signal, wherein the receptacle comprises a retainer attached to the initiator to retain the connector, the retainer having a generally annular shape, wherein the splines are formed on an inside diameter of the retainer.

17. The inflation assembly of claim 14, wherein the inflator comprises a housing, wherein the receptacle comprises a collar anchored in the housing to retain the connector, wherein the splines are formed on an inside diameter of the collar.

18. The inflation assembly of claim 14, wherein the receptacle comprises a washer disposed to retain the connector, wherein the splines are formed on an inside diameter of the washer.

19. The inflation assembly of claim 14, wherein the inflator comprises a housing shaped to retain the connector, wherein the splines are formed on an inside diameter of the housing.

20. The inflation assembly of claim 14, wherein the receptacle is a first receptacle and the connector is a first connector, the inflator further comprising a second receptacle comprising at least three splines disposed to mate with at least one rib of a second connector, wherein the splines of the first and second receptacles are configured differently from each other to prevent insertion of the first connector into the second receptacle and to prevent insertion of the second connector into the first receptacle.

21. The inflation assembly of claim 14, wherein the receptacle comprises at least twelve splines arrayed in a circle.

22. The inflation assembly of claim 13, wherein the receptacle comprises a geometric shape and the connector comprises a corresponding geometric shape sized to fit within the geometric shape of the receptacle.

23. The inflation assembly of claim 13, wherein the inflator comprises an initiator that ignites in response to receipt of the activation signal, the initiator comprising a center pin, a header eyelet encircling at least a portion of the center pin, a bridge wire that electrically couples the center pin and the header eyelet together, a quantity of ignition material positioned to ignite in response to combustion of the bridge wire, and a cup welded to the header eyelet to provide a hermetic seal.

24. The inflation assembly of claim 23, wherein the inflator further comprises a body that at least partially encircles the header eyelet and a cover attached to the body to electrically insulate the initiator from a housing of the inflator.

25. The inflation assembly of claim 24, wherein the body is insert molded around the header eyelet and the cover.

26. The inflation assembly of claim 24, wherein the cover is ultrasonically welded to the body.

27. The inflation assembly of claim 24, wherein the cover is snapped into engagement with the body.

28. The inflation assembly of claim 24, wherein the inflator comprises a housing, wherein the body is shaped to be retained directly by the housing.

29. The inflation assembly of claim 24, wherein the inflator comprises a housing and a collar shaped to be retained by the housing.

30. The inflation assembly of claim 29, wherein the collar comprises a first piece and a second piece attached to the first piece, wherein the body is insert molded into engagement with the first piece and is integrally formed with a retainer attached to the initiator to retain the connector.

31. The inflation assembly of claim 29, wherein the collar is formed of a metal shaped by stamping.

32. The inflation assembly of claim 29, wherein the inflator further comprises a washer disposed generally between the collar and the body to restrict relative motion between the collar and the body due to deformation of the body.

33. The inflation assembly of claim 29, wherein the inflator further comprises a washer, wherein the body is insert molded into engagement with the washer to restrict relative motion between the collar and the body due to deformation of the body.

34. The inflation assembly of claim 24, wherein the body is press fit into place to prevent moisture entry into the inflator and inflation gas exit out of the inflator through a region encircling the body.

35. The inflation assembly of claim 24, wherein the inflator comprises an o-ring encircling the body to prevent moisture entry into the inflator and inflation gas exit out of the inflator through a region encircling the body.

36. The inflation assembly of claim 24, wherein the inflator comprises an annular ridge disposed to press into the body to prevent moisture entry into the inflator and inflation gas exit out of the inflator through a region encircling the body.

37. The inflation assembly of claim 24, wherein the receptacle comprises a retainer ultrasonically welded to the body to retain the connector, the retainer having a generally annular shape.

38. The inflation assembly of claim 13, wherein the connector is shaped to interlock nonremovably with the receptacle.

39. The inflation assembly of claim 13, wherein the connector comprises a main body and a locking bracket movable with respect to the main body between an unlocked position in which the connector is removable from the receptacle and a locked position in which the connector is not removable from the receptacle.

40. The inflation assembly of claim 39, wherein the connector further comprises a shunting bar movably disposed within the main body to prevent transmission of the activation signal by the connector when the locking bracket is in the unlocked position, wherein the receptacle comprises a shunting clip disposed to prevent receipt of the activation signal by the initiator when the connector is disengaged from the receptacle.

41. An inflator for an airbag module for protecting an occupant of a vehicle from impact, the inflator comprising:
   a housing;
   an initiator disposed at least partially within the housing, wherein the initiator ignites in response to receipt of an activation signal; and
   a retainer coupled to the initiator, the retainer comprising at least three splines shaped to mate with at least one rib of a connector such that the connector is engageable with the retainer in at least three orientations to enable conveyance of the activation signal from the connector to the initiator, wherein the splines and the rib mesh to prevent rotation of the connector between the orientations.

42. The inflator of claim 41, further comprising a body that encircles at least a portion of the initiator, wherein the retainer is ultrasonically welded to the body.

43. The inflator of claim 42, wherein the initiator comprises a center pin, a header eyelet encircling at least a portion of the center pin, a bridge wire that electrically couples the center pin and the header eyelet together, a quantity of ignition material positioned to ignite in response to combustion of the bridge wire, and a cup welded to the header eyelet to provide a hermetic seal.

44. The inflator of claim 43, further comprising a cover attached to the body to electrically insulate the initiator from the housing.

* * * * *